United States Patent
Sano et al.

(10) Patent No.: US 8,734,987 B2
(45) Date of Patent: May 27, 2014

(54) ACTIVE MATERIAL, ELECTRODE CONTAINING SAME, LITHIUM-ION SECONDARY BATTERY WITH THE ELECTRODE, AND METHOD OF MANUFACTURING ACTIVE MATERIAL

(75) Inventors: Atsushi Sano, Tokyo (JP); Keitaro Otsuki, Tokyo (JP); Kouji Tokita, Tokyo (JP); Tomohiko Kato, Tokyo (JP); Akiji Higuchi, Kyoto (JP)

(73) Assignee: TDK Corporation, Tokyo (JP)

( * ) Notice: Subject to any disclaimer, the term of this patent is extended or adjusted under 35 U.S.C. 154(b) by 131 days.

(21) Appl. No.: 13/160,968

(22) Filed: Jun. 15, 2011

(65) Prior Publication Data

US 2011/0311868 A1 Dec. 22, 2011

(30) Foreign Application Priority Data

Jun. 18, 2010 (JP) ................ P2010-139833
Jun. 18, 2010 (JP) ................ P2010-139834
Jun. 18, 2010 (JP) ................ P2010-139836
Jun. 18, 2010 (JP) ................ P2010-139838

(51) Int. Cl.
*H01M 4/131* (2010.01)

(52) U.S. Cl.
USPC ....................................... 429/211

(58) Field of Classification Search
None
See application file for complete search history.

(56) References Cited

U.S. PATENT DOCUMENTS

| | | | |
|---|---|---|---|
| 2010/0078591 A1 | 4/2010 | Sano et al. | |
| 2013/0153821 A1* | 6/2013 | Evenson et al. | 252/182.1 |

FOREIGN PATENT DOCUMENTS

| | | |
|---|---|---|
| CN | 101714623 A | 5/2010 |
| JP | A-2003-68304 | 3/2003 |
| JP | A-2004-303527 | 10/2004 |

OTHER PUBLICATIONS

Li et al., "Hydrothermal Synthesis, Structure, and Magnetic Properties of a New Polymorph of Lithium Vanadyl(IV) Orthophosphate: β-LiVOPO$_4$," Journal of Solid State Chemistry, 1991, pp. 352-359, vol. 95.
Dupre et al., "Positive electrode materials for lithium batteries based on VOPO$_4$," Solid State Ionics, 2001, pp. 209-221, vol. 140.
Dupre et al., "Electrochemical performance of different Li—VOPO$_4$ systems," Journal of Power Sources, 2001, pp. 532-534, vol. 97-98.
Barker et al., "Electrochemical Properties of Beta-LiVOPO$_4$ Prepared by Carbothermal Reduction," Journal of the Electrochemical Society, 2004, pp. A796-A800, vol. 151—No. 6.

* cited by examiner

*Primary Examiner* — Patrick Ryan
*Assistant Examiner* — Wyatt McConnell
(74) *Attorney, Agent, or Firm* — Oliff PLC

(57) ABSTRACT

The method of manufacturing an active material in accordance with the first aspect of the invention yields an active material containing LiVOPO$_4$ capable of improving the cycle characteristic of a battery. Methods of manufacturing active materials in accordance with the second, third, and fourth aspects of the present invention yield active materials containing LiVOPO$_4$ capable of improving the discharge capacity of a battery.

8 Claims, 6 Drawing Sheets

US 8,734,987 B2

ACTIVE MATERIAL, ELECTRODE CONTAINING SAME, LITHIUM-ION SECONDARY BATTERY WITH THE ELECTRODE, AND METHOD OF MANUFACTURING ACTIVE MATERIAL

BACKGROUND OF THE INVENTION

1. Field of the Invention

The present invention relates to an active material, an electrode containing the same, a lithium-ion secondary battery equipped with the electrode, and a method of manufacturing the active material.

2. Related Background Art

Laminar compounds such as $LiCoO_2$ and $LiNi_{1/3}Mn_{1/3}CO_{1/3}O_2$ and spinel compounds such as $LiMn_2O_4$ have conventionally been used as positive electrode materials (positive electrode active materials) for lithium-ion secondary batteries. Attention has recently been focused on compounds of olivine-type structures such as $LiFePO_4$. Positive electrode materials having olivine structures have been known to exhibit high thermal stability at high temperatures and achieve high safety. However, lithium-ion secondary batteries using $LiFePO_4$ are disadvantageous in that their charge/discharge voltage is low, i.e., about 3.5 V, thus exhibiting low energy density. Therefore, $LiCoPO_4$, $LiNiPO_4$, and the like have been proposed as phosphate-based positive electrode active materials which can achieve high charge/discharge voltage. Nevertheless, the lithium-ion secondary batteries using these positive electrode materials have not yet attained sufficient capacity. Among the phosphate-based positive electrode materials, $LiVOPO_4$ has been known as a compound which can achieve 4-V class charge/discharge voltage. However, even lithium-ion secondary batteries using $LiVOPO_4$ have failed to attain sufficient reversible capacity, rate characteristic, and cycle characteristic. The above-mentioned positive electrode materials are disclosed in the following literatures, for example. In the following, the lithium-ion secondary battery will be referred to as "battery" as the case may be.

Japanese Patent Application Laid-Open No. 2003-68304
Japanese Patent Application Laid-Open No. 2004-303527
J. Solid State Chem., 95, 352 (1991)
N. Dupre et al., Solid State Ionics, 140, pp. 209-221 (2001)
N. Dupre et al., J. Power Sources, 97-98, pp. 532-534 (2001)
J. Baker et al., J. Electrochem. Soc., 151, A796 (2004)

Crystals expressed by the structural formula of $LiVOPO_4$ have been known to reversibly insert and desorb lithium ions. The structures expressed by the structural formula of $LiVOPO_4$ have been said to have different crystal structures such as those of $\alpha$ and $\beta$ types, the $\alpha$ type being a structure thermodynamically more stable than the $\beta$ type. Japanese Patent Application Laid-Open No. 2004-303527 discloses the making of $LiVOPO_4$ having a $\beta$-type crystal structure (orthorhombic crystal) and $LiVOPO_4$ having an $\alpha$-type crystal structure (triclinic crystal) by a solid-phase method employing $V_2O_5$ and their use as electrode active materials for nonaqueous electrolyte secondary batteries. Japanese Patent Application Laid-Open No. 2004-303527 also reports that the discharge capacity of a battery using $LiVOPO_4$ having the $\alpha$-type crystal structure (triclinic crystal) is lower than that of $LiVOPO_4$ having the $\beta$-type crystal structure (orthorhombic crystal).

J. Baker et al., J. Electrochem. Soc., 151, A796 (2004) discloses a method (carbothermal reduction (CTR) method) which heats $VOPO_4$ and $Li_2CO_3$ in the presence of carbon, so that carbon reduces $VOPO_4$, thereby producing $LiVOPO_4$ having the $\beta$-type crystal structure. J. Solid State Chem., 95, 352 (1991) discloses a method of making $LiVOPO_4$ having the $\beta$-type crystal structure by using tetravalent vanadium.

SUMMARY OF THE INVENTION

First Aspect of Invention

In view of the problems of the prior art mentioned above, it is an object of the first aspect of the present invention to provide a method of manufacturing an active material, an active material, and a lithium-ion secondary battery which can improve the cycle characteristic of a lithium-ion secondary battery.

For achieving the above-mentioned object, the method of manufacturing an active material in accordance with the first aspect of the present invention comprises a hydrothermal synthesis step of heating a mixed liquid containing a lithium source, a phosphate source, a vanadium source having pentavalent vanadium, water, and citric acid under pressure, wherein the mixed liquid has a citric acid concentration of 0.7 to 2.6 mol/L.

The method in accordance with the first aspect of the present invention can produce $\alpha$-type crystals (triclinic crystals) of $LiVOPO_4$ with a high yield. Lithium-ion secondary batteries containing thus obtained $LiVOPO_4$ as a positive electrode active material achieve an excellent cycle characteristic.

Preferably, in the method in accordance with the first aspect of the present invention, the mixed liquid has a Raman spectrum with a peak at a Raman shift of 970 to 990 $cm^{-1}$. In the mixed liquid having such a peak, pentavalent vanadium is reduced by citric acid, so as to produce tetravalent vanadium, whereby $LiVOPO_4$ containing pentavalent vanadium as its constituent element is easier to occur.

The active material in accordance with the first aspect of the present invention comprises $LiVOPO_4$, while $LiVOPO_4$ has an $\alpha$-type crystal phase content of at least 82 mol % with respect to the total amount of $LiVOPO_4$. The lithium-ion secondary battery in accordance with the first aspect of the present invention comprises a positive electrode having a positive electrode current collector and a positive electrode active material layer disposed on the positive electrode current collector, wherein the positive electrode active material layer contains the active material in accordance with the first aspect of the present invention.

The active material in accordance with the first aspect of the present invention can be obtained by the method of manufacturing an active material in accordance with the first aspect of the present invention, for example. The lithium-ion secondary battery in accordance with the first aspect of the present invention achieves an excellent cycle characteristic.

The first aspect of the present invention can provide a method of manufacturing an active material, an active material, and a lithium-ion secondary battery which can improve the cycle characteristic of a lithium-ion secondary battery.

Second Aspect of Invention

In view of the problems of the prior art mentioned above, it is an object of the second aspect of the present invention to provide a method of manufacturing an active material, an active material, and a lithium-ion secondary battery which can improve the discharge capacity of a lithium-ion secondary battery.

For achieving the above-mentioned object, the method of manufacturing an active material in accordance with the second aspect of the present invention comprises a hydrothermal synthesis step of heating a mixed liquid containing a lithium source, a phosphate source, a vanadium source having pentavalent vanadium, water, and a reductant under pressure, wherein the mixed liquid has a reductant concentration of 0.005 to 0.4 mol/L.

The method in accordance with the second aspect of the present invention can produce nanoscale β-type crystals (orthorhombic crystals) of $LiVOPO_4$ with a high yield. Lithium-ion secondary batteries containing thus obtained $LiVOPO_4$ as a positive electrode active material achieve high discharge capacity.

Preferably, in the method in accordance with the second aspect of the present invention, the reductant is tartaric acid. This increases the yield of β-type crystals of $LiVOPO_4$, thereby making it easier to improve the discharge capacity of batteries.

Preferably, in the method in accordance with the second aspect of the present invention, the mixed liquid has a Raman spectrum with a peak at a Raman shift of 970 to 990 $cm^{-1}$. In the mixed liquid having such a peak, pentavalent vanadium is reduced by citric acid, so as to produce tetravalent vanadium, whereby $LiVOPO_4$ containing pentavalent vanadium as its constituent element is easier to occur.

The active material in accordance with the second aspect of the present invention comprises a particle group of $LiVOPO_4$, while $LiVOPO_4$ has a β-type crystal phase content of at least 71 mol % with respect to the total amount of $LiVOPO_4$. The lithium-ion secondary battery in accordance with the second aspect of the present invention comprises a positive electrode having a positive electrode current collector and a positive electrode active material layer disposed on the positive electrode current collector, wherein the positive electrode active material layer contains the active material in accordance with the second aspect of the present invention.

The active material in accordance with the second aspect of the present invention can be obtained by the method of manufacturing an active material in accordance with the second aspect of the present invention, for example. The lithium-ion secondary battery in accordance with the second aspect of the present invention achieves high discharge capacity.

Preferably, as counted from the smaller primary particle side in a volume-based particle size distribution of the particle group determined by a laser scattering method, a primary particle size D50 at a cumulative volume ratio of 50% is 500 nm or less in the active material in accordance with the second aspect of the present invention. Batteries using $LiVOPO_4$ having such a small particle size are easier to improve their discharge capacity.

The second aspect of the present invention can provide a method of manufacturing an active material, an active material, and a lithium-ion secondary battery which can improve the discharge capacity of a lithium-ion secondary battery.

Third Aspect of Invention

The active materials containing $LiVOPO_4$ obtained by the methods disclosed in the above-mentioned literatures have failed to yield sufficient discharge capacity.

It is therefore an object of the third aspect of the present invention to provide an active material, an electrode containing the same, a lithium-ion secondary battery equipped with the electrode, and a method of manufacturing the active material which can attain sufficient discharge capacity.

The inventors conducted diligent studies and, as a result, have found that a hydrothermal synthesis using a mixture containing a lithium source, a pentavalent vanadium source, a phosphate source, water, and tartaric acid with a specific tartaric acid concentration and a specific ratio of the number of moles of tartaric acid to the number of moles of vanadium atoms contained in the pentavalent vanadium source can yield an active material having an average particle size and a crystallite size which are much smaller than those of the conventional active materials, so that the active material can attain sufficient discharge capacity even at 1 C.

Hence, the method of manufacturing an active material in accordance with the third aspect of the present invention comprises a step of preparing a mixture containing a lithium source, a pentavalent vanadium source, a phosphate source, water, and tartaric acid and a hydrothermal synthesis step of heating the mixture to 200° C. or higher under pressure, so as to yield $LiVOPO_4$, wherein the mixture has a tartaric acid concentration of 0.5 to 2.0 mol/L and wherein the ratio of the number of moles of tartaric acid to the number of moles of vanadium atoms contained in the pentavalent vanadium source is 10 to 150 mol %.

Preferably, in the mixture, the ratio of the number of moles of tartaric acid to the number of moles of vanadium atoms contained in the pentavalent vanadium source is 25 to 125 mol %. The active material in accordance with the third aspect of the present invention manufactured by using such a material mixture can attain higher discharge capacity.

Preferably, the mixture is a transparent solution in which the lithium source, pentavalent vanadium source, and phosphate source are dissolved in water. Using such a solution can reliably yield the active material in accordance with the third aspect of the present invention.

The active material in accordance with the third aspect of the present invention includes a particle containing $LiVOPO_4$ as a main component and having an average particle size of 10 to 145 nm and a crystallite size of 1 to 70 nm.

The active material in accordance with the third aspect of the present invention is obtained by the above-mentioned method and yields sufficient discharge capacity. Though the reason is unclear, it seems that, since the average particle size and crystallite size are much smaller than those of the conventional active materials, lithium ions are more likely to diffuse into crystal lattices of $LiVOPO_4$, thereby making it easier to insert and desorb lithium ions.

Preferably, in the active material in accordance with the third aspect of the present invention, the particle forms an aggregate, while the aggregate has an average size of 500 to 5000 nm. Sufficient discharge capacity can be obtained when the aggregate has an average size falling within the specific range mentioned above.

The electrode in accordance with the third aspect of the present invention comprises a current collector and an active material layer, disposed on the current collector, containing the above-mentioned active material. This yields an electrode having sufficient discharge capacity.

The lithium-ion secondary battery in accordance with the third aspect of the present invention comprises the above-mentioned electrode. This yields a lithium-ion secondary battery having sufficient discharge capacity.

The third aspect of the present invention can provide an active material, an electrode containing the same, a lithium-ion secondary battery equipped with the electrode, and a method of manufacturing the active material which can attain sufficient discharge capacity.

Fourth Aspect of Invention

The active materials containing $LiVOPO_4$ having the β-type crystal structure obtained by the methods disclosed in the above-mentioned literatures failed to yield sufficient discharge capacity.

It is therefore an object of the fourth aspect of the present invention to provide an active material, an electrode containing the same, a lithium-ion secondary battery equipped with the electrode, and a method of manufacturing the active material which can attain sufficient discharge capacity.

The inventors conducted diligent studies and, as a result, have found that heating a mixture containing a lithium source, a pentavalent vanadium source, a phosphate source, water, and citric acid to 200° C. or higher under pressure can manufacture an active material in which the orientation of $LiVOPO_4$ crystals is highly controlled, and that this active material yields sufficient discharge capacity.

Preferably, the method of manufacturing an active material in accordance with the fourth aspect of the present invention further comprises the step of heating $LiVOPO_4$ having the β-type crystal structure obtained by the hydrothermal synthesis step.

Preferably, the mixture is a suspension in which at least a part of the lithium source, pentavalent vanadium source, and phosphate source is undissolved in water. Using such a mixture can reliably yield the active material in accordance with the fourth aspect of the present invention.

The active material in accordance with the fourth aspect of the present invention contains $LiVOPO_4$ of the β-type crystal structure as a main component, wherein, according to X-ray diffractometry, the ratio of a peak intensity attributable to a (102) plane to a peak intensity attributable to a (020) plane is at least 0.6 but not more than 1.9, and the ratio of a peak intensity attributable to a (201) plane to the peak intensity attributable to the (020) plane is at least 1.8 but not more than 4.0, and wherein the active material has a polyhedral particle form.

The active material in accordance with the fourth aspect of the present invention yields sufficient discharge capacity. Though the reason is unclear, it seems that, since its orientations to the (102) and (201) planes are lower and higher than those in the conventional active materials, respectively, lithium ions are more likely to diffuse.

Preferably, in the active material in accordance with the fourth aspect of the present invention, the ratio of the peak intensity attributable to the (102) plane to the peak intensity attributable to the (020) plane is at least 0.6 but not more than 1.0, and the ratio of the peak intensity attributable to the (201) plane to the peak intensity attributable to the (020) plane is at least 1.8 but not more than 3.0. When the ratio of the peak intensity attributable to the (102) plane to the peak intensity attributable to the (020) plane and the ratio of the peak intensity attributable to the (201) plane to the peak intensity attributable to the (020) plane are values falling within the specific ranges mentioned above, particularly high discharge capacity can be obtained.

The electrode in accordance with the fourth aspect of the present invention comprises a current collector and an active material layer, disposed on the current collector, containing the above-mentioned active material. This yields an electrode having sufficient discharge capacity.

The lithium-ion secondary battery in accordance with the fourth aspect of the present invention comprises the above-mentioned electrode. This yields a lithium-ion secondary battery having sufficient discharge capacity.

The fourth aspect of the present invention can provide an active material, an electrode containing the same, a lithium-ion secondary battery equipped with the electrode, and a method of manufacturing the active material which can attain sufficient discharge capacity.

DESCRIPTION OF THE PREFERRED EMBODIMENTS

Embodiment of First Aspect of Invention

Figure 1:
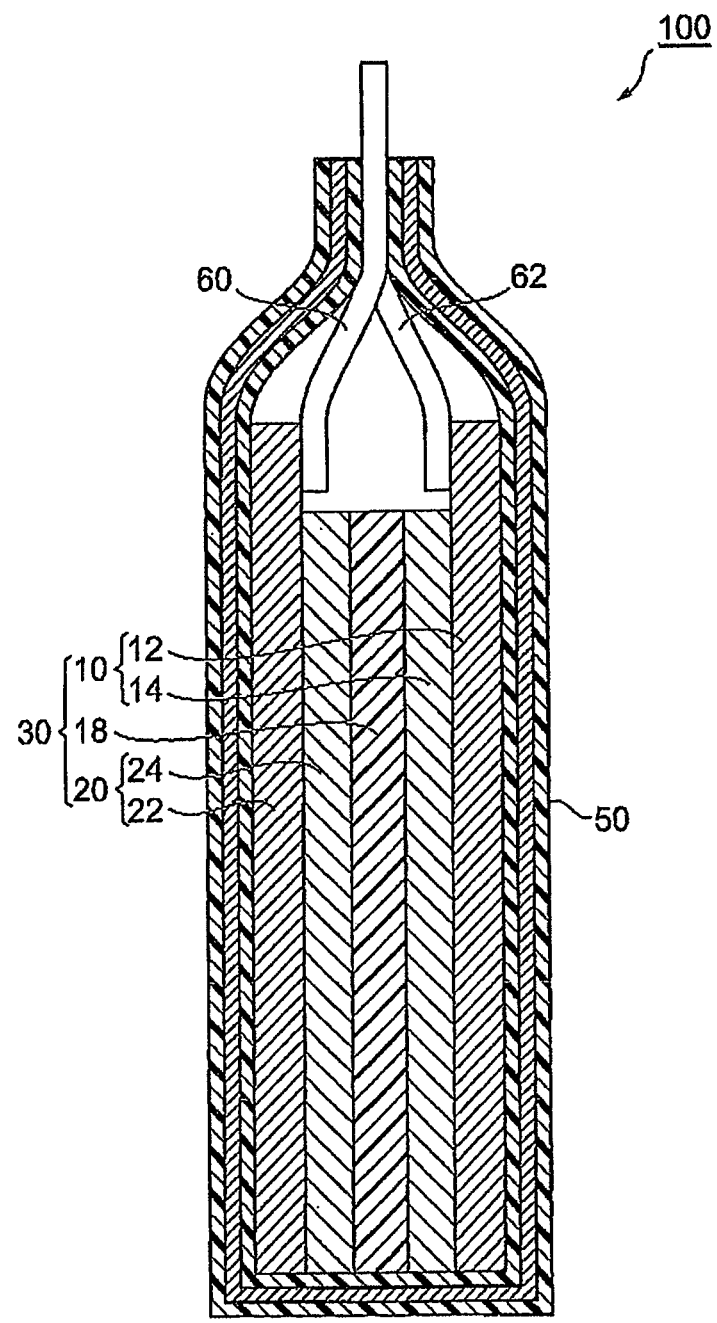
FIG. 1 is a schematic view of a lithium-ion secondary battery equipped with a positive electrode active material layer containing the active material in accordance with the first, second, third, or fourth aspect of the present invention.

In the following, an embodiment of the first aspect of the present invention (hereinafter referred to as "first embodiment") will be explained in detail with reference to the drawings. In the drawings, the same or equivalent parts will be referred to with the same signs while omitting their overlapping descriptions. Positional relationships such as upper, lower, left, and right will be based on those illustrated in the drawings unless otherwise specified. Ratios of dimensions and positional relationships in the drawings are not limited to those depicted.

Method of Manufacturing an Active Material

Hydrothermal Synthesis Step

The method of manufacturing an active material in accordance with the first embodiment comprises a hydrothermal synthesis step. First, in the hydrothermal synthesis step, a lithium source, a phosphate source, a vanadium source, water, and citric acid are fed into a reaction vessel having a function of heating and pressurizing the inside thereof (e.g., autoclave), so as to prepare a mixed liquid (aqueous solution) having them dispersed therein. Preferably, the lithium, phosphate, and vanadium sources are dissolved in the mixed liquid substantially completely and uniformly. That is, it is preferred for the mixed liquid to be translucent or transparent without being suspended. This makes it easier to synthesize $LiVOPO_4$ having a high ratio of α-type crystal phase and an excellent cycle characteristic. When preparing the mixed liquid, a mixture of the phosphate source, vanadium source, water, and citric acid may be refluxed at first before adding the lithium source thereto, for example. The reflux can form a complex of the phosphate and vanadium sources.

The vanadium source contains vanadium whose valence is 5. Pentavalent vanadium is reduced by citric acid which is a reductant in the mixed liquid, so as to become tetravalent vanadium. The inventors consider that citric acid coordinates with vanadium reduced in the mixed liquid, so that the valence of vanadium stabilizes at 4. However, it is uncertain whether or not tetravalent vanadium is provided with citric acid as a ligand. In the mixed liquid, vanadium may exist as an ion such as $V^{5+}$ or $V^{4+}$ or a vanadate (vanadium oxide) ion having tetravalent or pentavalent vanadium.

If the valence of vanadium contained in the vanadium source is 4 or less, vanadium is reduced by citric acid in the mixed liquid, so as to attain a valence of 3 or less. $LiVOPO_4$ includes tetravalent vanadium as its constituent element and thus is hard to synthesize in the mixed liquid containing vanadium whose valence is 3 or less. The vanadium source whose valence is 4 or less is also unfavorable in that it is more expensive than the vanadium source constituted by pentavalent vanadium and thus increases the manufacturing cost of $LiVOPO_4$.

The citric acid concentration in the mixed liquid is 0.7 to 2.6 mol with respect to 1 L of the mixed liquid. The citric acid concentration in the mixed liquid is preferably 0.8 to 2.5 mol/L, more preferably 1.2 to 1.5 mol/L. This allows the vanadium source to dissolve sufficiently in the mixed liquid, whereby pentavalent vanadium is reliably reduced to tetravalent vanadium, so as to synthesize α-type $LiVOPO_4$ which is excellent in the cycle characteristic. When the citric acid concentration is outside of the range of 0.7 to 2.6 mol, the ratio of α-type phase in thus obtained $LiVOPO_4$ falls short of 82 mol %, thereby worsening the cycle characteristic of batteries.

Preferably, the Raman spectrum of the mixed liquid has a peak at a Raman shift of 970 to 990 $cm^{-1}$. This peak indicates the existence of $V^{4+}$ or a vanadate ion having tetravalent vanadium. That is, this peak implies that the vanadium source has been dissolved substantially completely by the action of citric acid in the mixed liquid, whereby pentavalent vanadium in the vanadium source has been reduced, so as to produce tetravalent vanadium. Thus, the hydrothermal synthesis using the mixed liquid having a peak in a region where the Raman shift is 970 to 990 $cm^{-1}$ in the Raman spectrum makes it easier to yield $LiVOPO_4$ which is excellent in the cycle characteristic. In other words, the hydrothermal synthesis using the mixed liquid in which the vanadium source is substantially completely dissolved makes it easier to yield $LiVOPO_4$ which is excellent in the cycle characteristic. Here, the Raman spectrum is a spectrum representing the intensity of Raman scattered light corresponding to the difference (Raman shift) between the frequency of Raman scattered light and the frequency of incident light and can be measured by known Raman spectrometry.

For example, at least one kind selected from the group consisting of $LiNO_3$, $Li_2CO_3$, LiOH, LiCl, $Li_2SO_4$, $Li_3PO_3$, and $CH_3COOLi$ may be used as the lithium source.

For example, at least one kind selected from the group consisting of $H_3PO_4$, $NH_4H_2PO_4$, $(NH_4)_2HPO_4$, and $Li_3PO_4$ may be used as the phosphate source.

For example, at least one kind selected from the group consisting of $V_2O_5$ and $NH_4VO_3$ may be used as the vanadium source.

Two or more kinds of the lithium source, two or more kinds of the phosphate source, or two or more kinds of the vanadium source may be used together.

In the hydrothermal synthesis step, the ratio [P]/[V] of the number of moles of phosphorus element [P] contained in the mixed liquid before heating to the number of moles [V] of vanadium element contained in the mixed liquid may be adjusted to 0.9 to 1.2. [P]/[V] may be adjusted by the compounding ratio between the phosphate and vanadium sources. The effects of the first embodiment are achieved even when [P]/[V] is outside of the range mentioned above, however.

In the hydrothermal synthesis step, the ratio [Li]/[V] of the number of moles of lithium element [Li] contained in the mixed liquid before heating to [V] may be adjusted to 0.9 to 1.2. [Li]/[V] may be adjusted by the compounding ratio between the lithium and vanadium sources. The effects of the first embodiment are achieved even when [Li]/[V] is outside of the range mentioned above, however.

In the hydrothermal synthesis step, the mixed liquid within the closed reaction vessel is heated under pressure, so that a hydrothermal reaction proceeds in the mixed liquid. This hydrothermally synthesizes $LiVOPO_4$ which is an active material.

In the hydrothermal synthesis step, the mixed liquid may be heated to 150 to 300° C. under pressure. This inhibits $LiVOPO_4$ from growing its crystals in excess and makes it easier to yield $LiVOPO_4$ having a small particle size of nm-scale and high Li diffusibility. When the heating temperature of the mixed liquid is too low, the generation and crystal growth of $LiVOPO_4$ may fail to proceed sufficiently. When the heating temperature of the mixed liquid is too high, the reaction vessel tends to require higher heat resistance, thereby increasing the manufacturing cost for the active material. The effects of the first embodiment are achieved even when the heating temperature of the mixed liquid is outside of the range mentioned above, however.

The pressure applied to the mixed liquid in the hydrothermal synthesis step may be 0.2 to 1 MPa. When the pressure applied to the mixed liquid is too low, finally obtained $LiVOPO_4$ tends to lower its crystallinity, thereby decreasing its capacity density. When the pressure applied to the mixed liquid is too high, the reaction vessel tends to require higher heat resistance, thereby increasing the manufacturing cost for the active material. The effects of the first embodiment are achieved even when the pressure applied to the mixed liquid is outside of the range mentioned above, however.

Heat Treatment Step

The method of manufacturing an active material in accordance with the first embodiment may further comprise a heat treatment step of heating the mixed liquid after the hydrothermal synthesis step. The heat treatment step can advance the reaction of the part of lithium, phosphate, and vanadium sources that has not reacted in the hydrothermal synthesis step and promote the crystal growth of $LiVOPO_4$ generated in the hydrothermal synthesis step. This improves the capacity density of $LiVOPO_4$ and the discharge capacity, rate characteristic, and cycle characteristic of batteries using the same.

In the first embodiment, it becomes easier to form crystals of $LiVOPO_4$ having a sufficient size by the hydrothermal synthesis step alone when the mixed liquid is heated in a high-temperature region of 200 to 300° C. in the hydrothermal synthesis step. In the first embodiment, a desirable active material can be formed by the hydrothermal synthesis step alone even when the mixed liquid is heated in a low-temperature region of less than 200° C. in the hydrothermal synthesis step. In the case where the mixed liquid is heated in the low-temperature region in the hydrothermal synthesis step, however, the heat treatment step performed subsequent to the hydrothermal synthesis step tends to promote the synthesis and crystal growth of $LiVOPO_4$, thereby further improving the effects of the first embodiment.

When the heat treatment step is performed, the mixed liquid after the hydrothermal synthesis step may be heated at a heat treatment temperature of 400 to 700° C. The heat treatment time for the mixed liquid may be 3 to 20 hr. The heat treatment atmosphere for the mixed liquid may be a nitrogen, argon, or air atmosphere.

The mixed liquid obtained by the hydrothermal synthesis step may be preheated at about 60 to 150° C. for about 1 to 30 hr before being heated by the heat treatment step. The preheating removes excess moisture and organic solvents, thereby turning the mixed liquid into powder. This powder may be subjected to the heat treatment step. This can prevent $LiVOPO_4$ from incorporating impurities therein and homogenize the particle form.

The Active Material and Lithium-Ion Secondary Battery

The active material in accordance with the first embodiment can be obtained by the above-mentioned method of manufacturing an active material in accordance with the first embodiment. The active material in accordance with the first embodiment contains $LiVOPO_4$, while $LiVOPO_4$ has an α-type crystal phase content of at least 82 mol % with respect to the total amount of $LiVOPO_4$. The upper limit for the α-type crystal phase content is not limited in particular and may be 100 mol % or 98.5 mol %. The cycle characteristic of batteries deteriorates when the α-type crystal phase content is less than 82 mol %. Though not restricted in particular, the volume-average primary particle size of $LiVOPO_4$ is on the order of 50 to 1000 nm.

As illustrated in FIG. 1, the lithium-ion secondary battery in accordance with the first embodiment is equipped with a power generating element 30 comprising sheet-like positive and negative electrodes 10, 20 opposing each other and a sheet-like separator 18 disposed between and adjacent to the positive and negative electrodes 10, 20; an electrolytic solution containing lithium ions; a case 50 accommodating them in a closed state; a negative electrode lead 60 having one end part electrically connected to the negative electrode 20 and the other end part projecting out of the case; and a positive electrode lead 62 having one end part electrically connected to the positive electrode 10 and the other end part projecting out of the case.

The negative electrode 20 has a sheet-like (film-like) negative electrode current collector 22 and a negative electrode active material layer 24 formed on the negative electrode current collector 22. The positive electrode 10 has a sheet-like (film-like) positive electrode current collector 12 and a positive electrode active material layer 14 formed on the positive electrode current collector 12. The separator 18 is placed between the negative electrode active material layer 24 and positive electrode active material layer 14.

The positive electrode active material layer 14 contains the active material in accordance with the first embodiment.

The positive electrode current collector 12 may be any conductive sheet material, examples of which include thin metal sheets made of foils of aluminum, copper, and nickel. The positive electrode active material layer 14 contains the active material in accordance with the first embodiment, a binder, and a necessary amount of a conductive material.

The binder binds particles of the active material to each other and the active material to the positive electrode current collector 12.

As the binder, any material can be used as long as it achieves the binding mentioned above, examples of which include fluororesins such as polyvinylidene fluoride (PVDF), polytetrafluoroethylene (PTFE), tetrafluoroethylene/hexafluoropropylene copolymers (FEP), tetrafluoroethylene/perfluoroalkylvinylether copolymers (PFA), ethylene/tetrafluoroethylene copolymers (ETFE), polychlorotrifluoroethylene (PCTFE), ethylene/chlorotrifluoroethylene copolymers (ECTFE), and polyvinyl fluoride (PVF).

Other examples of the binder include fluororubbers based on vinylidene fluoride such as vinylidene fluoride/hexafluoropropylene-based fluororubbers (VDF/HFP-based fluororubbers), vinylidene fluoride/hexafluoropropylene/tetrafluoroethylene-based fluororubbers (VDF/HFP/TFE-based fluororubbers), vinylidene fluoride/pentafluoropropylene-based fluororubbers (VDF/PFP-based fluororubbers), vinylidene fluoride/pentafluoropropylene/tetrafluoroethylene-based fluororubbers (VDF/PFP/TFE-based fluororubbers), vinylidene fluoride/perfluoromethylvinylether/tetrafluoroethylene-based fluororubbers (VDF/PFMVE/TFE-based fluororubbers), and vinylidene fluoride/chlorotrifluoroethylene-based fluororubbers (VDF/CTFE-based fluororubbers.

Still other examples of the binder include polyethylene, polypropylene, polyethylene terephthalate, aromatic polyamides, cellulose, styrene/butadiene rubber, isoprene rubber, butadiene rubber, and ethylene/propylene rubber. Also usable are thermoplastic elastomeric polymers such as styrene/butadiene/styrene block copolymers and their hydrogenated derivatives, styrene/ethylene/butadiene/styrene copolymers, and styrene/isoprene/styrene block copolymers and their hydrogenated derivatives. Further, syndiotactic 1,2-polybutadiene, ethylene/vinyl acetate copolymers, propylene-α-olefin copolymers (having a carbon number of 2 to 12), and the like may be used.

Electronically and ionically conductive polymers may also be used as the binder. An example of the electronically conductive polymer is polyacetylene. In this case, the binder also functions as a conductive material, thereby making it unnecessary to add the conductive material thereto.

As the ionically conductive polymer, one which conducts ions such as lithium ions can be used, for example. Its examples include those in which monomers of polymer compounds (polyether-based polymer compounds such as polyethylene oxide and polypropylene oxide, crosslinked polymers of polyether compounds, polyepichlorohydrin, polyphosphazene, polysiloxane, polyvinylpyrrolidone, polyvinylidene carbonate, polyacrylonitrile, and the like) are complexed with lithium salts or alkali metal salts mainly composed of lithium such as $LiClO_4$, $LiBF_4$, $LiPF_6$, $LiAsF_6$, LiCl, LiBr, $Li(CF_3SO_2)_2N$, and $LiN(C_2F_5SO_2)_2$. Examples of polymerization initiators used for complexing include photopolymerization initiators and thermal polymerization initiators suitable for the monomers mentioned above.

Preferably, the binder content in the positive electrode active material layer 14 is 0.5 to 6 mass % based on the mass of the active material layer. When the binder content is less than 0.5 mass %, the amount of the binder tends to be too small to form a strong active material layer. When the binder content exceeds 6 mass %, by contrast, a greater amount of the binder tends to be kept from contributing to the electric capacity, thereby making it harder to yield sufficient volume energy density. In particular, when the binder has a low electronic conductivity in this case, the active material layer tends to increase its electric resistance, thereby failing to yield sufficient electric capacity.

Examples of the conductive material include carbon blacks, carbon materials, fine powders of metals such as copper, nickel, stainless, and iron, mixtures of the carbon materials and fine metal powders, and conductive oxides such as ITO.

As the negative electrode current collector 22, any conductive sheet material can be used, examples of which include thin metal sheets made of foils of aluminum, copper, and nickel. As the negative electrode active material, known negative electrode active materials for batteries can be used without any restrictions in particular. Examples of the negative electrode active material include carbon materials such as graphite, non-graphitizing carbon, graphitizable carbon, and low-temperature-friable carbon which can occlude and release (intercalate and deintercalate or be doped and undoped with) lithium ions; metals such as Al, Si, and Sn which are combinable with lithium; amorphous compounds mainly composed of oxides such as $SiO_2$ and $SnO_2$; and particles containing lithium titanate ($Li_4Ti_5O_{12}$) and the like.

The negative electrode can use a binder and a conductive material similar to those of the positive electrode.

A method of manufacturing the electrodes 10, 20 in accordance with the first embodiment will now be explained. The method of manufacturing the electrodes 10, 20 in accordance with the first embodiment comprises a step (which may hereinafter be referred to as "coating step") of applying coating materials which are materials for the electrode active material layers 14, 24 onto their corresponding current collectors and a step (which may hereinafter be referred to as "solvent removal step") of removing the solvents from the coating materials applied onto the current collectors.

The coating step of applying the coating materials to the current collectors 12, 22 will now be explained. The coating materials include their corresponding active materials mentioned above, the binder, and a solvent. The coating materials may further contain conductive materials for enhancing the conductivity of the active materials, for example, in addition to the components mentioned above. Examples of the solvent include N-methyl-2-pyrrolidone and N,N-dimethylformamide.

Methods and orders of mixing the components such as the active materials, binder, solvent, and conductive materials constituting the coating materials are not restricted in particular. For example, the active material, conductive material, and binder may be mixed together at first, and then N-methyl-2-pyrrolidone may be added thereto and mixed therewith, so as to prepare a coating material.

The above-mentioned coating materials are applied to the current collectors 12, 22, respectively. Any method employable for making electrodes in general can be used as a coating method without any restrictions in particular. Its examples include slit die coating and doctor blading.

Subsequently, the solvent removal step removes the solvent from the coating materials applied onto the current collectors 12, 22. The removal method is not restricted in particular. For example, the current collectors 12, 22 coated with the coating materials may be heated in an atmosphere at a temperature of 80 to 150° C.

The electrodes thus formed with the active material layers 14, 24 may thereafter be pressed with a roll press, for example, if necessary. The linear pressure for the roll press may be 10 to 50 kgf/cm, for example.

The foregoing steps can make the electrodes in accordance with the first embodiment.

The other constituents of the lithium-ion secondary battery 100 using the electrodes made as mentioned above will now be explained.

The electrolyte is one contained within the positive electrode active material layer 14, negative electrode active material layer 24, and separator 18. The electrolyte is not limited in particular. For example, an electrolytic solution (an aqueous solution or an electrolytic solution using an organic solvent) containing a lithium salt can be used in the first embodiment. Since the tolerable voltage of aqueous electrolytic solutions during charging is limited to a low level because of their electrochemically low decomposition voltage, electrolytic solutions using organic solvents (nonaqueous electrolytic solutions) are preferred. As the electrolytic solution, one dissolving a lithium salt into a nonaqueous solvent (organic solvent) is preferably used. Examples of the lithium salt include salts such as $LiPF_6$, $LiClO_4$, $LiBF_4$, $LiAsF_6$, $LiCF_3SO_3$, $LiCF_3CF_2SO_3$, $LiC(CF_3SO_2)_3$, $LiN(CF_3SO_2)_2$, $LiN(CF_3CF_2SO_2)_2$, $LiN(CF_3SO_2)(C_4F_9SO_2)$, $LiN(CF_3CF_2CO)_2$, and LiBOB. These salts may be used either singly or in combinations of two or more.

Preferred examples of the organic solvent include propylene carbonate, ethylene carbonate, and diethyl carbonate. They may be used either singly or in combinations of two or more in given ratios.

In the first embodiment, the electrolyte may be not only a liquid but also a gelled electrolyte obtained by adding a gelling agent thereto. A solid electrolyte (a solid polymer electrolyte or an electrolyte made of an ionically conductive organic material) may be contained in place of the electrolytic solution.

The separator 18 is an electrically insulating porous body, examples of which include monolayer or multilayer bodies of films constituted by any of polyethylene, polypropylene, and polyolefin, extended films of mixtures of these resins, and fibrous nonwovens constituted by at least one kind of constituent material selected from the group consisting of cellulose, polyester, and polypropylene.

The case 50 is one which seals the power generating element 30 and electrolytic solution therein. The case 50 is not limited in particular as long as it can inhibit the electrolytic solution from leaking out therefrom and moisture and the like from invading the lithium-ion secondary battery 100 from the outside. For example, a metal-laminated film in which a metal foil is coated with polymer films on both sides can be utilized as the case 50. An aluminum foil can be used as the metal foil, for example, while films of polypropylene and the like can be used as the polymer films. Preferred examples of the material for the outer polymer film include polymers having a high melting point such as polyethylene terephthalate (PET) and polyamide, while preferred examples of the material for the inner polymer film include polyethylene (PE) and polypropylene (PP).

The leads 60, 62 are formed from a conductive material such as aluminum.

Then, the leads 62, 60 are welded to the positive and negative electrode current collectors 12, 22, respectively, and inserted into the case 50 together with the electrolytic solution, while the separator 18 is held between the positive electrode active material layer 14 of the positive electrode 10 and the negative electrode active material layer 24 of the negative electrode 20. Thereafter, the entrance of the case 50 is sealed.

Though one embodiment of the first aspect of the present invention has been explained in detail in the foregoing, the first aspect of the present invention is not limited to the first embodiment.

For example, carbon particles may be added to the mixed liquid before heating in the hydrothermal synthesis step. This makes it possible to generate at least a part of $LiVOPO_4$ on carbon particle surfaces, so that the carbon particles support $LiVOPO_4$. This can improve the electric conductivity of the resulting active material. Examples of materials constituting the carbon particles include carbon blacks such as acetylene black, graphite, activated carbon, hard carbon, and soft carbon.

The active material of the first embodiment can also be used as an electrode material for electrochemical devices other than the lithium-ion secondary battery. Examples of such electrochemical devices include secondary batteries other than the lithium-ion secondary battery, e.g., metallic lithium secondary batteries (using an electrode containing the active material of the first aspect of the present invention as a positive electrode and metallic lithium as a negative electrode), and electrochemical capacitors such as lithium capacitors. These electrochemical devices can be used for power supplies for self-propelled micromachines, IC cards, and the like and decentralized power supplies placed on or within printed boards.

EXAMPLES

The first aspect of the present invention will now be explained more specifically with reference to examples and comparative examples, but will not be limited to the following Examples.

Example 1

Composition of a Mixed Liquid

A mixed liquid containing the following materials was prepared in the manufacturing of $LiVOPO_4$ of Example 1.

Lithium source: 8.48 g (0.20 mol) of $LiOH.H_2O$ (Mw=41.96; special grade having a purity of 99 wt % manufactured by Nacalai Tesque, Inc.)

Phosphate source: 23.06 g (0.20 mol) of $H_3PO_4$ (Mw=98.00; first grade having a purity of 85 wt % manufactured by Nacalai Tesque, Inc.)

Vanadium source: 18.37 g (0.10 mol) of $V_2O_5$ (Mw=181.88; special grade having a purity of 99 wt % manufactured by Nacalai Tesque, Inc.)

Distilled water: 200 g (for HPLC (high-performance liquid chromatography), manufactured by Nacalai Tesque, Inc.) (Separately, 20 g of distilled water were used between an inner glass tube and an autoclave.)

Reductant: 42.24 g (0.20 mol) of citric acid monohydrate (molecular formula=$C_6H_8O_7.H_2O$; Mw=210.14; special grade having a purity of 99.5 wt % manufactured by Nacalai Tesque, Inc.)

Concentration of the reductant (citric acid) in the mixed liquid: 1.0 mol/L

Ratio of the reductant (citric acid) to 1 mol of vanadium in the mixed liquid: 100 mol vs. V As can be seen from the respective contents of the above-mentioned phosphate and vanadium sources, the ratio [P]/[V] of the number of moles of phosphorus element [P] contained in the mixed liquid and the number of moles of vanadium element [V] contained in the mixed liquid was adjusted to 1. As can be seen from the respective contents of the above-mentioned lithium and vanadium sources, the ratio [Li]/[V] of the number of moles of phosphorus element [Li] contained in the mixed liquid to [V] was adjusted to 1. As can be seen from the content of the lithium source and the amount of distilled water, the concentration of $Li^+$ in the mixed liquid was adjusted to 1.0 mol/L. The above-mentioned amounts of the materials, when converted to $LiVOPO_4$ (Mw=168.85), correspond to amounts for stoichiometrically yielding about 33.78 g (0.2 mol) of $LiVOPO_4$.

Preparation of the Mixed Liquid

The above-mentioned mixed liquid was prepared in the following procedure. First, $V_2O_5$, distilled water, and $H_3PO_4$ were introduced into a 500-mL Erlenmeyer flask in this order and stirred with a magnetic stirrer. Citric acid monohydrate was added to the mixture obtained by the stirring. The pH of the mixture having citric acid monohydrate added thereto was 2. The mixture having citric acid monohydrate added thereto was stirred at room temperature for 23 hr. After the stirring for 23 hr, a blue homogenous solution was obtained. The pH of the solution was 2.

A 35-mm football-shaped rotator was put into a 0.5-L inner glass tube of an autoclave, and $LiOH.H_2O$ and 279.79 g of the above-mentioned blue solution were introduced into the inner glass tube in this order, so as to prepare the mixed liquid of Example 1 having the composition mentioned above. Here, 279.79 g of the blue mixed liquid include materials corresponding to 95.5% of the yield, 33.78 g, assumed at the time of feeding the materials. When mixing $LiOH.H_2O$ with the blue solution within the inner glass tube, the hue of the liquid did not change. Upon visual observation, the materials (the lithium, phosphate, and vanadium sources and the reductant) were completely dissolved in the mixed liquid of Example 1, so that no solid was seen. That is, the mixed liquid of Example 1 was seen to be transparent without being suspended.

Hydrothermal Synthesis Step

The inner glass tube containing the mixed liquid of Example 1 was closed, and heating for the mixed liquid was started under predetermined PID control while stirring the mixed liquid with a high-power magnetic stirrer within the inner glass tube. The pressure within the inner glass tube was raised by the steam generated upon heating. Thus, the hydrothermal synthesis step heated the mixed liquid within the inner glass tube for 15 hr under pressure. The temperature within the inner glass tube was held at 250° C. in the hydrothermal synthesis step.

The mixed liquid within the inner glass tube was heated for 15 hr as mentioned above and then cooled with air for about 8 hr after the heating was stopped. The mixed liquid was taken out from the inner glass tube after its temperature dropped to room temperature. The mixed liquid taken out from the inner glass tube was a bright brown suspension containing a bright brown precipitate. Bubbling was seen in the suspension. The pH of the suspension was 5 to 6. The inner glass tube was stood still, and only the supernatant within the vessel was subjected to filtration. The filtrate was slightly whitely turbid but substantially colorless. The inside of the inner glass tube was washed by stirring with about 400 ml of distilled water introduced therein. The pH of the distilled water after washing was 7. Immediately thereafter, the distilled water after washing was subjected to suction filtration. A brown precipitate obtained by the filtration was washed with about 500 ml of acetone and then subjected to suction filtration again. The precipitate remaining after the filtration was dried with warm air; whereby 33.02 g of a brown solid were obtained. The weight of the brown solid, when converted to $LiVOPO_4$, was found to correspond to 97.8% of the yield, 33.78 g, of $LiVOPO_4$ assumed at the time of feeding the materials.

Heat Treatment Step

Of the dried brown solid, 3.00 g were put into an alumina crucible. Using a heating furnace, a heat treatment step for heating the solid within the alumina crucible was carried out. The heat treatment step heated the solid within the alumina crucible in an air atmosphere. The heat treatment step raised the temperature within the furnace from room temperature to 450° C. over 45 min, heated the solid within the alumina crucible for 4 hr at 450° C., and then naturally cooled the heating furnace. The heat treatment step yielded 2.94 g of a bright green powder as the active material of Example 1. The residual ratio of the solid in the heat treatment step was 98 mass %.

Examples 2 to 8 and Comparative Examples 1 to 3

As the reductant, hydrazine was used in place of citric acid in Comparative Example 1. The reductant concentration in the mixed liquid (hereinafter referred to as "concentration X") was adjusted to values listed in Table 1 in Examples 2 to 8 and Comparative Examples 1 to 3. The ratio of the reductant to 1 mol of vanadium in the mixed liquid (hereinafter referred to as "ratio Y") was adjusted to values listed in Table 1 in Examples 2 to 8 and Comparative Examples 1 to 3.

The active materials of Examples 2 to 8 and Comparative Examples 1 to 3 were obtained by the same method as that of Example 1 except for the foregoing points.

Solubility of Materials in the Mixed Liquids

The solubility of the materials (the lithium, phosphate, and vanadium sources and the reductant) in each of the mixed liquids of the examples and comparative examples was studied by the same method as that of Example 1. Table 1 lists the results.

Measurement of Raman Spectra

The Raman spectrum of the mixed liquid of Example 1 before heating in the hydrothermal synthesis step was measured by Raman spectrometry. For measuring the Raman spectrum, Raman spectrometry system model 532 manufactured by Kaiser Optical Systems, Inc. was used. In the measurement of the Raman spectrum, the mixed liquid was irradiated with a laser having a wavelength of 532 nm. A peak at a Raman shift of 982 $cm^{-1}$ was seen in the Raman spectrum of Example 1. This is a peak derived from $V^{4+}$ in the vanadate ion in the mixed liquid. A peak at a Raman shift of 1035 to 1130 $cm^{-1}$ was also seen in the Raman spectrum of Example 1. This is a peak derived from $V^{4+}$ in the vanadate ion different in the state of vibration from $V^{4+}$ corresponding to the peak at a Raman shift of 982 $cm^{-1}$. Upon the measurement of the Raman spectrum, it was seen that the vanadium source was completely dissolved in the mixed liquid of Example 1 so that pentavalent vanadium was reduced and changed into tetravalent vanadium.

By the same method as that of Example 1, Raman spectra were measured in the mixed liquids of the examples and comparative examples before heating in the hydrothermal synthesis step, so as to see whether or not a peak whose Raman shift was 982 $cm^{-1}$ (hereinafter referred to as "Raman peak") existed. Table 1 lists the results.

Measurement of Crystal Structures

Analyses by powder X-ray diffractometry (XRD) verified that the active materials of all the examples and comparative examples were $LiVOPO_4$. The content (unit: mol %) of the α-type crystal phase in $LiVOPO_4$ in each of the examples and comparative examples was determined by Rietveld analysis based on X-ray diffractometry (XRD). Table 1 lists the results.

Making of Evaluation Cells

The active material of Example 1 and a mixture of polyvinylidene fluoride (PVDF) as a binder and acetylene black were dispersed into N-methyl-2-pyrrolidone (NMP) acting as a solvent, so as to prepare a slurry. The slurry was prepared such that the weight ratio among the active material, acetylene black, and PVDF became 84:8:8 therein. The slurry was applied onto an aluminum foil acting as a current collector, dried, and then extended under pressure, so as to yield an electrode (positive electrode) formed with an active material layer containing the active material of Example 1.

Thus obtained electrode and an Li foil acting as its opposite electrode were subsequently laminated with a separator made of a microporous polyethylene film interposed therebetween, so as to yield a multilayer body (matrix). This multilayer body was put into an aluminum-laminated pack, a 1-M $LiPF_6$ solution was injected therein as an electrolytic solution, and then the pack was sealed in vacuum, so as to make an evaluation cell of Example 1.

Respective evaluation cells singly using the active materials of Examples 2 to 8 and Comparative Examples 1 to 3 were made by the same method as that of Example 1.

Cycle Characteristic Evaluation

The capacity maintenance ratio of each of the evaluation cells of the examples and comparative examples was measured. Each cell was electrically charged at a rate of 1 C at 25° C. by constant-current, constant-voltage charging at 4.2 V. Thereafter, constant-current discharging to 2.5 V was performed at a rate of 1 C at 25° C. Counting them as 1 cycle of charging and discharging, 100 cycles were carried out. The ratio (%) of the discharge capacity at the 100th cycle to that of the 1st cycle was determined as the capacity maintenance ratio. The evaluation cells exhibiting higher capacity maintenance ratios are excellent in the cycle characteristic.

TABLE 1

| Table 1 | Reductant Name | Conc.X (mol/L) | Ratio Y (mol % vs. V) | Solubility of materials | Raman peak (at 982 $cm^{-1}$) | α-type crystal phase content (mol %) | Capacity maintenance ratio (%) |
|---|---|---|---|---|---|---|---|
| Example 1 | citric acid | 1 | 100 | dissolved completely | yes | 96 | 74 |
| Example 2 | citric acid | 0.8 | 100 | dissolved completely | yes | 92 | 73 |
| Example 3 | citric acid | 1.2 | 100 | dissolved completely | yes | 98.5 | 80 |
| Example 4 | citric acid | 1.5 | 100 | dissolved completely | yes | 95 | 85 |
| Example 5 | citric acid | 2 | 100 | dissolved completely | yes | 85 | 71 |
| Example 6 | citric acid | 2.5 | 100 | dissolved completely | yes | 82 | 70 |
| Example 7 | citric acid | 1 | 120 | dissolved completely | yes | 97 | 75 |
| Example 8 | citric acid | 1 | 80 | dissolved completely | yes | 93 | 73 |
| Comparative Example 1 | hydrazine | 1 | 100 | not dissolved completely | no | 5 | 56 |
| Comparative Example 2 | citric acid | 0.6 | 100 | dissolved completely | yes | 79 | 62 |
| Comparative Example 3 | citric acid | 3 | 100 | dissolved completely | yes | 73 | 67 |

As can be seen from Table 1, Examples 1 to 8 employed citric acid as a reductant in the hydrothermal synthesis step, while the citric acid concentration in the mixed liquid was 0.7 to 2.6 mol/L. The α-type crystal phase content in LiVOPO$_4$ was found to be 82 mol % or greater in Examples 1 to 8. The evaluation cells of Examples 1 to 8 were seen to have a cycle characteristic superior to that of Comparative Example 1 using hydrazine as the reductant. The cycle characteristic of the evaluation cells of Examples 1 to 8 was also seen to be superior to that of Comparative Examples 2 and 3 in which the citric acid concentration in the mixed liquid was outside of the range of 0.7 to 2.6 mol/L.

The mixed liquid of Comparative Example 1 containing hydrazine as the reductant was a suspension without completely dissolving the materials and thus was a paste having a nonuniform composition. No peak at a Raman shift of 982 cm$^{-1}$ was found in the mixed liquid of Comparative Example 1. LiVOPO$_4$ of Comparative Example 1 was seen to contain the β-type crystal phase as a main component.

REFERENCE SIGNS LIST

10 . . . positive electrode; 20 . . . negative electrode; 12 . . . positive electrode current collector; 14 . . . positive electrode active material layer; 18 . . . separator; 22 . . . negative electrode current collector; 24 . . . negative electrode active material layer; 30 . . . power generating element; 50 . . . case; 60, 62 . . . lead; 100 . . . lithium-ion secondary battery Embodiment of Second Aspect of Invention In the following, an embodiment of the second aspect of the present invention (hereinafter referred to as "second embodiment") will be explained in detail with reference to the drawings. In the drawings, the same or equivalent parts will be referred to with the same signs while omitting their overlapping descriptions. Positional relationships such as upper, lower, left, and right will be based on those illustrated in the drawings unless otherwise specified. Ratios of dimensions and positional relationships in the drawings are not limited to those depicted.

Method of Manufacturing an Active Material

Hydrothermal Synthesis Step

The method of manufacturing an active material in accordance with the second embodiment comprises a hydrothermal synthesis step. First, in the hydrothermal synthesis step, a lithium source, a phosphate source, a vanadium source, water, and a reductant are fed into a reaction vessel having a function of heating and pressurizing the inside thereof (e.g., autoclave), so as to prepare a mixed liquid (aqueous solution) having them dispersed therein. Preferably, the lithium, phosphate, and vanadium sources are dissolved in the mixed liquid substantially completely and uniformly. That is, it is preferred for the mixed liquid to be translucent or transparent without being suspended. This makes it easier to synthesize LiVOPO$_4$ having a high ratio of β-type crystal phase and high capacity density. When preparing the mixed liquid, a mixture of the phosphate source, vanadium source, water, and reductant may be refluxed at first before adding the lithium source thereto, for example. The reflux can form a complex of the phosphate and vanadium sources.

The vanadium source contains vanadium whose valence is 5. Pentavalent vanadium is reduced by citric acid which is a reductant in the mixed liquid, so as to become tetravalent vanadium. In the mixed liquid, vanadium may exist as an ion such as V$^{5+}$ or V$^{4+}$ or a vanadate (vanadium oxide) ion having tetravalent or pentavalent vanadium.

If the valence of vanadium contained in the vanadium source is 4 or less, vanadium is reduced by citric acid in the mixed liquid, so as to become vanadium whose valence is 3 or less. LiVOPO$_4$ includes tetravalent vanadium as its constituent element and thus is hard to synthesize in the mixed liquid containing vanadium whose valence is 3 or less. The vanadium source whose valence is 4 or less is also unfavorable in that it is more expensive than the vanadium source constituted by pentavalent vanadium and thus increases the manufacturing cost of LiVOPO$_4$.

The concentration of the reductant in the mixed liquid is 0.005 to 0.4 mol with respect to 1 L of the mixed liquid. This allows the vanadium source to dissolve sufficiently in the mixed liquid, so that pentavalent vanadium is reliably reduced to tetravalent vanadium, thereby synthesizing β-type LiVOPO$_4$. The reductant concentration outside of the numeric range mentioned above makes the ratio of α-type crystal phase greater than that of β-type crystal phase in LiVOPO$_4$ and increases the primary particle size D50 of LiVOPO$_4$, thereby lowering the discharge capacity of batteries.

While examples of the reductant include tartaric acid, ascorbic acid, and citric acid, tartaric acid is superior in terms of enhancing the ratio of β-type crystal phase in LiVOPO$_4$ and increasing the discharge capacity of batteries.

Preferably, the Raman spectrum of the mixed liquid has a peak at a Raman shift of 970 to 990 cm$^{-1}$. This peak indicates the existence of V$^{4+}$ or a vanadate ion having tetravalent vanadium. That is, this peak implies that the vanadium source has been dissolved substantially completely by the action of citric acid in the mixed liquid, whereby pentavalent vanadium in the vanadium source has been reduced, so as to produce tetravalent vanadium. Thus, the hydrothermal synthesis using the mixed liquid having a peak in a region where the Raman shift is 970 to 990 cm$^{-1}$ in the Raman spectrum makes it easier to yield LiVOPO$_4$ which has high discharge capacity. In other words, the hydrothermal synthesis using the mixed liquid in which the vanadium source is substantially completely dissolved makes it easier to yield LiVOPO$_4$ which has high discharge capacity. Here, the Raman spectrum is a spectrum representing the intensity of Raman scattered light corresponding to the difference (Raman shift) between the frequency of Raman scattered light and the frequency of incident light and can be measured by known Raman spectrometry.

For example, at least one kind selected from the group consisting of LiNO$_3$, Li$_2$CO$_3$, LiOH, LiCl, Li$_2$SO$_4$, Li$_3$PO$_3$, and CH$_3$COOLi may be used as the lithium source.

For example, at least one kind selected from the group consisting of H$_3$PO$_4$, NH$_4$H$_2$PO$_4$, (NH$_4$)$_2$HPO$_4$, and Li$_3$PO$_4$ may be used as the phosphate source.

For example, at least one kind selected from the group consisting of V$_2$O$_5$ and NH$_4$VO$_3$ may be used as the vanadium source.

Two or more kinds of the lithium source, two or more kinds of the phosphate source, or two or more kinds of the vanadium source may be used together.

In the hydrothermal synthesis step, the ratio [P]/[V] of the number of moles of phosphorus element [P] contained in the mixed liquid before heating to the number of moles [V] of vanadium element contained in the mixed liquid may be adjusted to 0.9 to 1.2. [P]/[V] may be adjusted by the compounding ratio between the phosphate and vanadium sources. The effects of the second embodiment are achieved even when [P]/[V] is outside of the range mentioned above, however.

In the hydrothermal synthesis step, the ratio [Li]/M of the number of moles of lithium element [Li] contained in the mixed liquid before heating to [V] may be adjusted to 0.9 to 1.2. [Li]/[V] may be adjusted by the compounding ratio between the lithium and vanadium sources. The effects of the second embodiment are achieved even when [Li]/[V] is outside of the range mentioned above, however.

In the hydrothermal synthesis step, the mixed liquid within the closed reaction vessel is heated under pressure, so that a hydrothermal reaction proceeds in the mixed liquid. This hydrothermally synthesizes $LiVOPO_4$ which is an active material.

In the hydrothermal synthesis step, the mixed liquid may be heated to 150 to 300° C. under pressure. This makes it easier to yield $LiVOPO_4$ having a small particle size of nm-scale and high Li diffusibility. When the heating temperature of the mixed liquid is too low, the generation and crystal growth of $LiVOPO_4$ may fail to proceed sufficiently. When the heating temperature of the mixed liquid is too high, $LiVOPO_4$ tends to grow its crystals in excess, thereby increasing its particle size. Also, when the heating temperature of the mixed liquid is too high, the reaction vessel tends to require higher heat resistance, thereby increasing the manufacturing cost for the active material. The effects of the second embodiment are achieved even when the heating temperature of the mixed liquid is outside of the range mentioned above, however.

The pressure applied to the mixed liquid in the hydrothermal synthesis step may be 0.2 to 1 MPa. When the pressure applied to the mixed liquid is too low, finally obtained $LiVOPO_4$ tends to lower its crystallinity, thereby decreasing its capacity density. When the pressure applied to the mixed liquid is too high, the reaction vessel tends to require higher heat resistance, thereby increasing the manufacturing cost for the active material. The effects of the second embodiment are achieved even when the pressure applied to the mixed liquid is outside of the range mentioned above, however.

Heat Treatment Step

The method of manufacturing an active material in accordance with the second embodiment may further comprise a heat treatment step of heating the mixed liquid after the hydrothermal synthesis step. The heat treatment step can advance the reaction of the part of lithium, phosphate, and vanadium sources that has not reacted in the hydrothermal synthesis step and promote the crystal growth of $LiVOPO_4$ generated in the hydrothermal synthesis step. This tends to improve the capacity density of $LiVOPO_4$ and the discharge capacity and rate characteristic of batteries using the same.

In the second embodiment, it becomes easier to form crystals of $LiVOPO_4$ having a sufficient size by the hydrothermal synthesis step alone when the mixed liquid is heated in a high-temperature region of 200 to 300° C. in the hydrothermal synthesis step. In the second embodiment, a desirable active material can be formed by the hydrothermal synthesis step alone even when the mixed liquid is heated in a low-temperature region of less than 200° C. in the hydrothermal synthesis step. In the case where the mixed liquid is heated in the low-temperature region in the hydrothermal synthesis step, however, the heat treatment step performed subsequent to the hydrothermal synthesis step tends to promote the synthesis and crystal growth of $LiVOPO_4$, thereby further improving the effects of the second embodiment.

When the heat treatment step is performed, the mixed liquid after the hydrothermal synthesis step may be heated at a heat treatment temperature of 400 to 700° C. The heat treatment time for the mixed liquid may be 3 to 20 hr. The heat treatment atmosphere for the mixed liquid may be a nitrogen, argon, or air atmosphere.

The mixed liquid obtained by the hydrothermal synthesis step may be preheated at a temperature of about 60 to 150° C. for about 1 to 30 hr before being heated by the heat treatment step. The preheating removes excess moisture and organic solvents, thereby turning the mixed liquid into powder. This powder may be subjected to the heat treatment step. This can prevent $LiVOPO_4$ from incorporating impurities therein and homogenize the particle form.

The Active Material and Lithium-Ion Secondary Battery

The active material in accordance with the second embodiment can be obtained by the above-mentioned method of manufacturing an active material in accordance with the second embodiment. The active material in accordance with the second embodiment contains a particle group of $LiVOPO_4$, while $LiVOPO_4$ has a $\beta$-type crystal phase content of at least 71 mol % with respect to the total amount of $LiVOPO_4$. The upper limit for the $\beta$-type crystal phase content, which is not limited in particular, may be 100 mol % or 95 mol %. The discharge capacity of batteries decreases when the $\beta$-type crystal phase content is less than 71 mol %. The $\beta$-type crystals of $LiVOPO_4$ have more linear and shorter ion conduction paths than those of the $\alpha$-type crystals (triclinic crystals) and thus are excellent in the characteristic of reversibly inserting and desorbing lithium ions. Therefore, batteries using an active material containing the $\beta$-type crystals of $LiVOPO_4$ by a higher ratio achieve a charge/discharge capacity higher than that of batteries using the $\alpha$-type crystals of $LiVOPO_4$.

As counted from the smaller primary particle side in a volume-based particle size distribution of the particle group of $LiVOPO_4$ determined by a laser scattering method, a primary particle size D50 at a cumulative volume ratio of 50% is preferably 500 nm or less, more preferably 260 nm or less, and particularly preferably 127 nm or less. The lower limit for D50, which is not restricted in particular, is about 47 nm. Thus, the particle size of $LiVOPO_4$ obtained by the method of manufacturing an active material in accordance with the second embodiment mentioned above is smaller than that of conventional $LiVOPO_4$. Therefore, $LiVOPO_4$ of the second embodiment increases the density of ion conduction paths and shortens the lithium ion diffusion length in the particles as compared with the conventional active materials, thereby enhancing the diffusibility of lithium ions. In the second embodiment, as $LiVOPO_4$ is formed smaller, its specific surface area becomes greater than that conventionally available. This improves the reversibility of Li in $LiVOPO_4$ and increases the contact area between a current collector and $LiVOPO_4$ and the contact area between a conducting agent in the active material layer and $LiVOPO_4$, thereby enhancing the density of conduction paths of electrons. Because of the foregoing, ionic and electronic conductivities and capacity density become better in $LiVOPO_4$ of the second embodiment than in the conventional active materials. Hence, discharge capacity improves in lithium-ion secondary batteries using $LiVOPO_4$ of the second embodiment.

The positive electrode active material layer of the lithium-ion secondary battery in accordance with the second embodiment contains the active material in accordance with the second embodiment. The lithium-ion secondary battery in accordance with the second embodiment is the same as the lithium-ion secondary battery in accordance with the first embodiment except for the active material contained in its positive electrode active material layer.

Though one embodiment of the second aspect of the present invention has been explained in detail in the foregoing, the second aspect of the present invention is not limited to the second embodiment.

For example, carbon particles may be added to the mixed liquid before heating in the hydrothermal synthesis step. This makes it possible to generate at least a part of $LiVOPO_4$ on carbon particle surfaces, so that the carbon particles support $LiVOPO_4$. This can improve the electric conductivity of the resulting active material. Examples of materials constituting the carbon particles include carbon blacks such as acetylene black, graphite, activated carbon, hard carbon, and soft carbon.

The active material of the second embodiment can also be used as an electrode material for electrochemical devices other than the lithium-ion secondary battery. Examples of such electrochemical devices include secondary batteries other than the lithium-ion secondary battery, e.g., metallic lithium secondary batteries (using an electrode containing the active material of the second aspect of the present invention as a positive electrode and metallic lithium as a negative electrode), and electrochemical capacitors such as lithium capacitors. These electrochemical devices can be used for power supplies for self-propelled micromachines, IC cards, and the like and decentralized power supplies placed on or within printed boards.

Examples

The second aspect of the present invention will now be explained more specifically with reference to examples and comparative examples, but will not be limited to the following Examples 11 to 19.

Example 11

Composition of a Mixed Liquid

A mixed liquid containing the following materials was prepared in the manufacturing of $LiVOPO_4$ of Example 11.

Lithium source: 1.70 g (0.04 mol) of $LiOH.H_2O$ (Mw=41.96; special grade having a purity of 99 wt % manufactured by Nacalai Tesque, Inc.)

Phosphate source: 4.69 g (0.04 mol) of $H_3PO_4$ (Mw=98.00; first grade having a purity of 85 wt % manufactured by Nacalai Tesque, Inc.)

Vanadium source: 3.67 g (0.02 mol) of $V_2O_5$ (Mw=181.88; special grade having a purity of 99 wt % manufactured by Nacalai Tesque, Inc.)

Distilled water: 200 g (for HPLC (high-performance liquid chromatography), manufactured by Nacalai Tesque, Inc.) (Separately, 20 g of distilled water were used between an inner glass tube and an autoclave.)

Reductant: 1.51 g (0.01 mol) of L-(+)-tartaric acid (molecular formula=$C_4H_6O_6$; Mw=150.09; special grade having a purity of 99.5 wt % manufactured by Nacalai Tesque, Inc.)

Concentration of the reductant (tartaric acid) in the mixed liquid: 0.05 mol/L

Ratio of the reductant (tartaric acid) to 1 mol of vanadium in the mixed liquid: 25 mol vs. V As can be seen from the respective contents of the above-mentioned phosphate and vanadium sources, the ratio [P]/[V] of the number of moles of phosphorus element [P] contained in the mixed liquid and the number of moles of vanadium element [V] contained in the mixed liquid was adjusted to 1. As can be seen from the respective contents of the above-mentioned lithium and vanadium sources, the ratio [Li]/[V] of the number of moles of phosphorus element [Li] contained in the mixed liquid to [V] was adjusted to 1. As can be seen from the content of the lithium source and the amount of distilled water, the concentration of $Li^+$ in the mixed liquid was adjusted to 0.2 mol/L. The above-mentioned amounts of the materials, as converted to $LiVOPO_4$ (Mw=168.85), correspond to amounts for stoichiometrically yielding about 6.756 g (0.04 mol) of $LiVOPO_4$.

Preparation of the Mixed Liquid

The above-mentioned mixed liquid was prepared in the following procedure. First, a 35-mm football-shaped rotator was put into a 0.5-L inner glass tube of an autoclave, and $V_2O_5$, distilled water, and $H_3PO_4$ were introduced therein in this order and stirred with a magnetic stirrer for 2.5 hr. L-(+)-tartaric acid was added to the mixture obtained by the stirring. The hue of the mixture did not change immediately after adding L-(+)-tartaric acid. The mixture stirred for 1 hr after adding L-(+)-tartaric acid became a bright yellow paste exhibiting a pH of 1. $LiOH.H_2O$ was added to this bright yellow paste, so as to yield the mixed liquid of Example 11 having the above-mentioned composition and exhibiting grass green color. The pH of the bright yellow paste immediately after adding $LiOH.H_2O$ was 3. Upon visual observation, the materials (the lithium, phosphate, and vanadium sources and the reductant) were completely dissolved in the mixed liquid of Example 11, so that no solid was seen. That is, the mixed liquid of Example 11 was seen to be transparent without being suspended.

Hydrothermal Synthesis Step

The inner glass tube containing the mixed liquid of Example 11 was closed, and heating for the mixed liquid was started under predetermined PID control while stirring the mixed liquid with a high-power magnetic stirrer within the inner glass tube. The pressure within the inner glass tube was raised by the steam generated upon heating. Thus, the temperature within the inner glass tube was held at 250° C. for about 10 hr under pressure in the hydrothermal synthesis step.

The heating was stopped when 10 hr passed since the temperature of the mixed liquid within the inner glass tube had reached 250° C. Subsequently, the mixed liquid was cooled with air for about 4.5 hr and then taken out from the inner glass tube after its temperature dropped to room temperature. The mixed liquid taken out from the inner glass tube was a suspension containing a reddish brown precipitation. No bubbling was seen in the suspension. The pH of the suspension was 6. The inner glass tube was stood still, and only the supernatant within the vessel was subjected to filtration. The filtrate was slightly whitely turbid. The inside of the inner glass tube was washed by stirring with about 200 ml of distilled water introduced therein. The pH of the distilled water after washing was 7. Immediately thereafter, the distilled water after washing was subjected to suction filtration. A brown or reddish brown precipitate obtained by the filtration was washed with about 200 ml of acetone and then subjected to suction filtration again with a filter with an opening size of 52 μm. The filtrate (acetone) was slightly whitely turbid. The brown precipitate remaining after the filtration was dried with warm air, so as to yield 6.04 g of a brown solid. The weight of the brown solid, when converted to $LiVOPO_4$, was found to correspond to 89.4% of the yield, 6.756 g, of $LiVOPO_4$ assumed at the time of feeding the materials.

Heat Treatment Step

Of the dried brown solid, 1.00 g was put into an alumina crucible. Using a heating furnace, a heat treatment step for heating the solid within the alumina crucible was carried out. The heat treatment step heated the solid within the alumina crucible in an air atmosphere. The heat treatment step raised the temperature within the furnace from room temperature to 450° C. over 45 min, heated the solid within the alumina crucible for 4 hr, and then naturally cooled the heating furnace. The heat treatment step yielded 0.98 g of a bright green powder as the active material of Example 11. The residual ratio of the solid in the heat treatment step was 98 mass %.

Examples 12 to 19 and Comparative Examples 11 to 13

Respective compounds listed in Table 2 were used as reductants in Examples 12 to 19 and Comparative Examples 11 to 13. The reductant concentration in the mixed liquid (hereinafter referred to as "concentration X") was adjusted to values listed in Table 2 in Examples 12 to 19 and Comparative Examples 11 to 13. The ratio of the reductant to 1 mol of vanadium in the mixed liquid (hereinafter referred to as "ratio Y") was adjusted to values listed in Table 2 in Examples 12 to 19 and Comparative Examples 11 to 13.

The active materials of Examples 12 to 19 and Comparative Examples 11 to 13 were obtained by the same method as that of Example 11 except for the foregoing points.

Solubility of Materials in the Mixed Liquids

The solubility of the materials (the lithium, phosphate, and vanadium sources and the reductant) in each of the mixed liquids of the examples and comparative examples was studied by the same method as that of Example 11. Table 2 lists the results.

Measurement of Raman Spectra

The Raman spectrum of the mixed liquid of Example 11 before heating in the hydrothermal synthesis step was measured by Raman spectrometry. For measuring the Raman spectrum, Raman spectrometry system model 532 manufactured by Kaiser Optical Systems, Inc. was used. In the measurement of the Raman spectrum, the mixed liquid was irradiated with a laser having a wavelength of 532 nm. A peak at a Raman shift of 982 $cm^{-1}$ was seen, in the Raman spectrum of Example 11. This is a peak derived from $V^{4+}$ in the vanadate ion in the mixed liquid. A peak at a Raman shift of 1035 to 1130 $cm^{-1}$ was also seen in the Raman spectrum of Example 11. This is a peak derived from $V^{4+}$ in the vanadate ion different in the state of vibration from $V^{4+}$ corresponding to the peak at a Raman shift of 982 $cm^{-1}$. Upon the measurement of the Raman spectrum, it was seen that the vanadium source was completely dissolved in the mixed liquid of Example 11 so that pentavalent vanadium was reduced and changed into tetravalent vanadium.

By the same method as that of Example 11, Raman spectra were measured in the mixed liquids of the examples and comparative examples before heating in the hydrothermal synthesis step, so as to see whether or not a peak whose Raman shift was 982 $cm^{-1}$ (hereinafter referred to as "Raman peak") existed. Table 2 lists the results.

Measurement of Crystal Structures

Analyses by powder X-ray diffractometry (XRD) verified that the active materials of all the examples and comparative examples were $LiVOPO_4$. The content (unit: mol %) of the β-type crystal phase in $LiVOPO_4$ in each of the examples and comparative examples was determined by Rietveld analysis based on X-ray diffractometry (XRD). Table 2 lists the results.

Measurement of Particle Size Distributions

Particle size distributions of $LiVOPO_4$ in the examples and comparative examples were measured by a laser scattering method (dynamic light scattering method). For measuring the particle size distributions, an apparatus manufactured by Malvern Instruments Ltd. was used. Then, the volume-based primary particle size D50 of $LiVOPO_4$ was determined in each of the examples and comparative examples. Table 2 lists the results.

Making of Evaluation Cells

The active material of Example 11 and a mixture of polyvinylidene fluoride (PVDF) as a binder and acetylene black were dispersed into N-methyl-2-pyrrolidone (NMP) acting as a solvent, so as to prepare a slurry. The slurry was prepared such that the weight ratio among the active material, acetylene black, and PVDF became 84:8:8 therein. The slurry was applied onto an aluminum foil acting as a current collector, dried, and then extended under pressure, so as to yield an electrode (positive electrode) formed with an active material layer containing the active material of Example 11.

Thus obtained electrode and an Li foil acting as its opposite electrode were subsequently laminated with a separator made of a microporous polyethylene film interposed therebetween, so as to yield a multilayer body (matrix). This multilayer body was put into an aluminum-laminated pack, a 1-M $LiPF_6$ solution was injected therein as an electrolytic solution, and then the pack was sealed in vacuum, so as to make an evaluation cell of Example 11.

Respective evaluation cells singly using the active materials of Examples 12 to 19 and Comparative Examples 11 to 13 were made by the same method as that of Example 11.

Measurement of Discharge Capacity

Using the evaluation cell of Example 11, the discharge capacity (unit: mAh/g) at a discharge rate of 0.01 C (the current value by which constant-current discharging at 25° C. completed in 100 hr) was measured. Table 2 lists the measured results.

The discharge capacity was measured in each of the evaluation cells of Examples 12 to 19 and Comparative Examples 11 to 13 by the same method as that of Example 11. Table 2 lists the results.

TABLE 2

| Table2 | Reductant Name | Conc.X (mol/L) | RatioY (mol % vs. V) | Solubility of materials | Raman peak (at 982 $cm^{-1}$) | β-type crystal phase content (mol %) | D50 (nm) | Discharge capacity (mAh/g) |
|---|---|---|---|---|---|---|---|---|
| Example 11 | tartaric acid | 0.05 | 25 | dissolved completely | yes | 95 | 87 | 129 |
| Example 12 | tartaric acid | 0.01 | 25 | dissolved completely | yes | 90 | 56 | 125 |
| Example 13 | tartaric acid | 0.1 | 25 | dissolved completely | yes | 91 | 127 | 121 |
| Example 14 | tartaric acid | 0.3 | 25 | dissolved completely | yes | 71 | 260 | 115 |
| Example 15 | tartaric acid | 0.005 | 25 | dissolved completely | yes | 78 | 47 | 119 |
| Example 16 | ascorbic acid | 0.1 | 25 | dissolved completely | yes | 82 | 158 | 119 |

TABLE 2-continued

| Table2 | Reductant Name | Conc.X (mol/L) | RatioY (mol % vs. V) | Solubility of materials | Raman peak (at 982 cm$^{-1}$) | β-type crystal phase content (mol %) | D50 (nm) | Discharge capacity (mAh/g) |
|---|---|---|---|---|---|---|---|---|
| Example 17 | citric acid | 0.1 | 25 | dissolved completely | yes | 89 | 138 | 118 |
| Example 18 | citric acid | 0.01 | 50 | dissolved completely | yes | 83 | 67 | 120 |
| Example 19 | citric acid | 0.01 | 15 | dissolved completely | yes | 86 | 71 | 121 |
| Comparative Example 11 | hydrazine | 1 | 25 | not dissolved completely | no | 97 | 5600 | 67 |
| Comparative Example 12 | tartaric acid | 0.5 | 25 | dissolved completely | yes | 23 | 680 | 98 |
| Comparative Example 13 | tartaric acid | 0.001 | 25 | not dissolved completely | no | 5 | 720 | 21 |

As can be seen from Table 2, the concentration of the reductant in the mixed liquid was 0.005 to 0.4 mol/L in Examples 11 to 19. The β-type crystal phase content in LiVOPO$_4$ was found to be 71 mol % or greater in Examples 11 to 19. The discharge capacity was seen to be higher in the evaluation cells of Examples 11 to 19 than in those of Comparative Examples 11 to 13 in which the concentration of the reductant was outside of the range of 0.005 to 0.4 mol/L.

Each of the mixed liquids of Comparative Examples 11 and 13 was a suspension without completely dissolving the materials and thus was a paste having a nonuniform composition. No peak at a Raman shift of 982 cm$^{-1}$ was found in each of the mixed liquids of Comparative Examples 11 and 13. LiVOPO$_4$ of each of Comparative Examples 12 and 13 was seen to contain the α-type crystal phase as a main component.

Embodiment of Third Aspect of Invention

In the following, an embodiment of the third aspect of the present invention (hereinafter referred to as "third embodiment") will be explained in detail with reference to the drawings. In the drawings, the same or equivalent parts will be referred to with the same signs while omitting their overlapping descriptions. Ratios of dimensions in the drawings are not limited to those depicted.

Active Material

Figure 2:
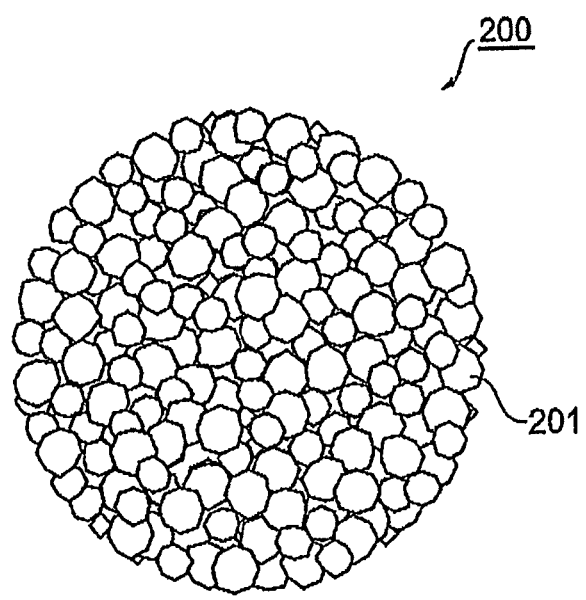
FIG. 2 is a schematic view illustrating an example of the active material in accordance with an embodiment of the third aspect of the present invention.
Figure 3:
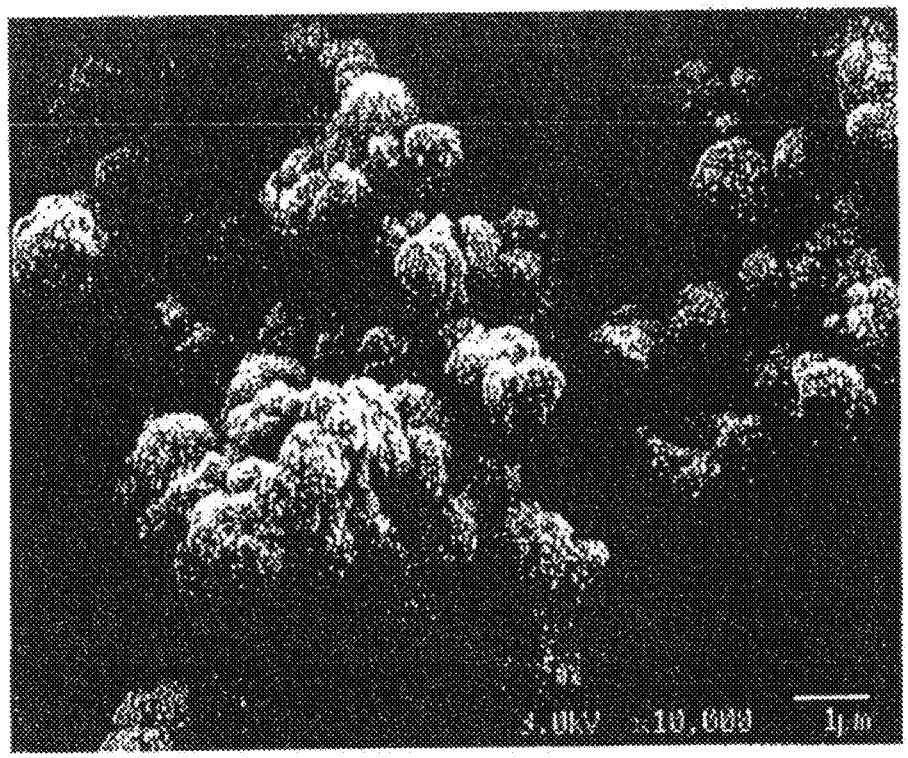
FIG. 3 is an electron micrograph showing an example of the active material in accordance with an embodiment of the third aspect of the present invention.

First, an active material in accordance with the third embodiment will be explained. FIG. 2 is a schematic view illustrating an example of the active material in accordance with the third embodiment. FIG. 3 is an electron micrograph showing an example of the active material in accordance with the third embodiment. The active material 200 in accordance with the third embodiment contains a plurality of particles 201 (particle group) having an average particle size of 10 to 145 nm and a crystallite size of 1 to 70 nm and containing LiVOPO$_4$ as a main component. Here, by the particles 201 are meant primary particles constituting the active material 200.

Here, by "containing LiVOPO$_4$ as a main component" is meant containing at least 80 mass %, preferably at least 90 mass %, more preferably at least 95 mass %, of LiVOPO$_4$ with respect to the total amount of the primary particles 201. LiVOPO$_4$ includes different crystal structures such as α- and β-type crystal structures. These crystal structures can be identified by X-ray diffractometry in general. Typically, LiVOPO$_4$ having the β-type crystal structure exhibits a peak at 2θ=27.0 degrees, while LiVOPO$_4$ having the α-type crystal structure exhibits a peak at 2θ=27.2 degrees. The crystallites of the active material 200 in accordance with the third embodiment are so small, as will be explained later, that a broad peak appears between 2θ=27.0 degrees and 2θ=27.2 degrees. Therefore, it is not always clear whether the active material 200 mainly contains LiVOPO$_4$ of the α-type crystal structure or β-type crystal structure. However, since the peak intensity at 2θ=27.2 degrees is detected higher than that at 2θ=27.0 degrees according to results of X-ray diffractometry of the active material 200 in accordance with the third embodiment, LiVOPO$_4$ of the α-type crystal structure seems to be mainly contained therein. The α-type crystal structure is thermodynamically more stable than the β-type crystal structure and thus is preferred from the viewpoint of durability in long-term use. The active material 200 in accordance with the third embodiment may contain trace amounts of unreacted material components and the like in addition to LiVOPO$_4$ of the β-type crystal structure and LiVOPO$_4$ of the α-type crystal structure.

The size of crystallites (which may also be referred to as "crystallite size" in the following) is 1 to 70 nm, preferably 10 to 65 nm, more preferably 15 to 45 nm, further preferably 17 to 35 nm. By the crystallite is meant the maximum assembly that can be regarded as a single crystal. The average particle size of the primary particles 201 of the active material 200 is 10 to 145 nm, preferably 20 to 140 nm, more preferably 40 to 105 nm, further preferably 42 to 80 nm.

The relationship between the crystallite in accordance with the third embodiment and the primary particle size of the active material 200 constituted by the crystallite will now be explained. Preferably, in the active material 200 in accordance with the third embodiment, the primary particle 201 is constituted by a plurality of crystallites. When the primary particle 201 is constituted by a plurality of crystallites, crystal grain boundaries formed by adjacent crystallites increase. It seems that the lithium ion diffusion rate is higher in the crystal grain boundaries than in the crystallites, so that lithium ions are more likely to diffuse into the crystal lattices and thus are easier to insert and desorb.

However, the primary particle 201 of the active material 200 is not always required to be constituted by a plurality of crystallites, but may consist of a single crystallite. When the primary particle 201 consists of a single crystallite, the average primary particle size equals the size of the single crystallite, so as to reduce the average primary particle size and increase the specific surface area in the primary particle 201, which seems to make lithium ions more likely to diffuse into the crystal lattices and easier to insert and desorb.

For example, the crystallite size can be calculated by measuring the half width by an X-ray diffractometer and inputting it into the following Scherrer equation:

$$\text{Crystallite size}(\text{'}) = K \cdot \lambda / (\beta \cdot \cos \theta) \quad (1)$$

where K is the Scherrer factor, λ is the wavelength of the X-ray tube used, β is the measured half width, and θ is the value computed by multiplying the measured 2θ by ½.

The average particle size of the primary particles 201 of the active material 200 is the value of D50 at a cumulative volume ratio of 50% in a number-based particle size distribution measured in the primary particles 201. For example, the number-based particle distribution of the primary particles 201 can be calculated from the cumulative ratio of the projected area circle-equivalent diameter determined from projected areas of the primary particles 201 on an image observed through a high-resolution scanning electron microscope. Here, the projected area circle-equivalent diameter represents the diameter (circle-equivalent diameter) of a sphere assumed to have the same projected area as that of a particle (primary particle 201) as the particle size (of the primary particle 201). The "average particle size of the aggregate", which will be explained later, is the value of D50 at a cumulative volume ratio of 50% in a number-based particle size distribution measured in the active material 200 (i.e., secondary particle), which is an aggregated particle of the primary particles 201, as with the above-mentioned average primary particle size.

Preferably, the active material 200 in accordance with the third embodiment is formed by aggregation of the primary particles 201, while the average size of their aggregates (i.e., the average particle size of secondary particles) is 500 to 5000 nm. Preferably, from the viewpoint of attaining higher discharge capacity, the active material 200 in accordance with the third embodiment has a spherical form as illustrated in FIG. 2.

Method of Manufacturing an Active Material

The method of manufacturing an active material in accordance with the third embodiment will now be explained. The method of manufacturing an active material in accordance with the third embodiment comprises the following material preparation step and hydrothermal synthesis step.

Material Preparation Step

The material preparation step is a step of preparing a mixture containing a lithium source, a pentavalent vanadium source, a phosphate source, water, and tartaric acid. Tartaric acid is added to the mixture by 0.5 to 2.0 mol/L with respect to the total amount of the mixture and by a molar ratio of 10 to 150 mol % with respect to the number of moles of vanadium atoms contained in the pentavalent vanadium source.

Mixture

Examples of the lithium source include lithium compounds such as $LiNO_3$, $Li_2CO_3$, $LiOH$, $LiCl$, $Li_2SO_4$, and $CH_3COOLi$. Preferred among them are $LiNO_3$ and $Li_2CO_3$. Examples of the pentavalent vanadium source include vanadium compounds such as $V_2O_5$ and $NH_4VO_3$. Examples of the phosphate source include $PO_4$-containing compounds such as $H_3PO_4$, $NH_4H_2PO_4$, $(NH_4)_2HPO_4$, and $Li_3PO_4$. Preferred among them are $H_3PO_4$ and $(NH_4)_2HPO_4$.

Preferably, the lithium source is compounded such that the ratio of the number of moles of lithium atoms to the number of moles of pentavalent vanadium atoms becomes 0.95 to 1.2. Preferably, the phosphate source is compounded such that the ratio of the number of moles of phosphorus atoms to the number of moles of pentavalent vanadium atoms becomes 0.95 to 1.2. When the compounding ratio of at least one of the lithium and phosphorus atoms is less than 0.95, the discharge capacity and rate characteristic of the resulting active material tend to become lower. When the compounding ratio of at least one of the lithium and phosphorus atoms is more than 1.2, the discharge capacity of the resulting active material tends to decrease.

The concentration of tartaric acid is 0.5 to 2.0 mol/L with respect to the total amount of the mixture, while the ratio of the number of moles of tartaric acid to the number of moles of vanadium atoms contained in the pentavalent vanadium source is 10 to 150 mol %. The active material 200 in accordance with the third embodiment can be obtained when tartaric acid is compounded by the ratio mentioned above. From the viewpoint of attaining the active material with higher discharge capacity, tartaric acid is preferably 0.9 to 1.1 mol/L with respect to the total amount of the mixture, while the ratio of the number of moles of tartaric acid to the number of moles of vanadium atoms contained in the pentavalent vanadium source is preferably 25 to 125 mol %, more preferably 50 to 100 mol %. Examples of tartaric acid in accordance with the third embodiment include L-(+)-tartaric acid (2R,3R), D-(−)-tartaric acid (2S,3S), meso-tartaric acid (2R,3S), and a racemic mixture which is a mixture of equal parts of L and D types, among which L-(+)-tartaric acid (2R,3R) is preferred.

Meanwhile, when making an active material containing layer of an electrode by using thus obtained active material, a conductive material such as a carbon material is typically brought into contact with a surface of the active material in order to enhance conductivity. As a method therefor, while the active material containing layer may be formed by mixing the active material and the conductive material after making the active material, carbon can be attached to the active material by adding a carbon material as a conductive material into a mixture to become a material for a hydrothermal synthesis, for example.

When adding a conductive material which is a carbon material into the mixture, examples of the conductive material include activated carbon, graphite, soft carbon, and hard carbon. Among them, activated carbon, which can easily disperse carbon particles into the mixture at the time of hydrothermal synthesis, is preferably used. Here, it is not necessary for the whole amount of the conductive material to be mixed with the mixture at the time of hydrothermal synthesis. Preferably, at least a part of the conductive material is mixed with the mixture at the time of hydrothermal synthesis. This may lower the amount of the binder at the time of forming the active material containing layer and increase the capacity density.

Preferably, the content of the above-mentioned conductive material such as a carbon particle in the mixture in the hydrothermal synthesis step is adjusted such that the number of moles C of carbon atoms constituting the carbon particle and the number of moles M of vanadium atoms contained in the pentavalent vanadium source, for example, satisfy the relationship of $0.04 \geq C/M \geq 4$. When the content of the conductive material (number of moles C) is too small, the electronic conductivity and capacity density of the electrode active material constituted by the active material and conductive material tend to decrease. When the conductive material content is too large, the weight occupied by the active material in the electrode active material tends to decrease relatively, thereby lowering the capacity density of the electrode active material. These tendencies can be suppressed when the conductive material content falls within the range mentioned above.

While the amount of water in the mixture is not restricted in particular as long as the hydrothermal synthesis is possible, the ratio of materials other than water in the mixture is preferably 35 mass % or less.

The order of feeding the materials when preparing the mixture is not restricted in particular. For example, all the materials may be mixed together. Alternatively, the pentavalent vanadium compound, water, and the $PO_4$-containing compound may be mixed at first, and then tartaric acid and the lithium compound may be added thereto in this order. The mixture immediately before the hydrothermal synthesis may fully be mixed, so that the lithium compound, pentavalent vanadium compound, and $PO_4$-containing compound are fully dispersed or completely dissolved in water, and is preferably a transparent solution in which the lithium compound, pentavalent vanadium compound, and $PO_4$-containing compound are completely dissolved in water in particular.

Hydrothermal Synthesis Step

First, in the hydrothermal synthesis step, the above-mentioned mixture (of the lithium compound, pentavalent vanadium compound, $PO_4$-containing compound, water, tartaric acid, and the like) is fed into a reaction vessel having a function of heating and pressurizing the inside thereof (e.g., autoclave). The mixture may be prepared in the reaction vessel as well.

Next, the reaction vessel is closed, and the mixture is heated to 200° C. or higher under pressure, so that a hydrothermal reaction of the mixture proceeds. This hydrothermally synthesizes the active material 200 in accordance with the third embodiment containing $LiVOPO_4$ as a main component and having an average particle size of 10 to 145 nm and a crystallite size of 1 to 70 nm.

The active material 200 obtained by the hydrothermal synthesis is typically dispersed in the liquid after the hydrothermal synthesis, so that the liquid after the hydrothermal synthesis is a suspension. For example, the liquid after the hydrothermal synthesis is filtrated, so as to collect a solid, which is washed with water, acetone, or the like and then dried, whereby the active material 200 containing $LiVOPO_4$ as a main component can be obtained with high purity.

Preferably, the pressure applied to the mixture in the hydrothermal synthesis step is 0.1 to 30 MPa. When the pressure applied to the mixture is too low, the resulting $LiVOPO_4$ tends to lower its crystallinity, thereby decreasing the capacity density of the active material. When the pressure applied to the mixture is too high, the reaction vessel tends to require high pressure resistance, thereby increasing the cost for manufacturing the active material. These tendencies can be suppressed when the pressure applied to the material mixture falls within the range mentioned above.

The temperature of the mixture in the hydrothermal synthesis step is preferably 200 to 300° C., more preferably 220 to 280° C. from the viewpoint of improving the discharge capacity of the resulting active material. When the temperature of the mixture is too low, the resulting $LiVOPO_4$ tends to lower its crystallinity, thereby decreasing the capacity density of the active material. When the temperature of the mixture is too high, the reaction vessel tends to require high heat resistance, thereby increasing the cost for manufacturing the active material. These tendencies can be suppressed when the temperature of the mixture falls within the range mentioned above.

Firing Step

The method of manufacturing an active material in accordance with the third embodiment may further comprise a step (which may also be referred to as "firing step" in the following) of heating the material obtained by the hydrothermal synthesis. This step seems to cause a phenomenon of removing impurities and the like remaining in the active material obtained through the hydrothermal synthesis step.

The firing step may heat the above-mentioned active material containing $LiVOPO_4$ as a main component to a temperature of 400 to 600° C. When the heating temperature is too high, the particle growth of the active material tends to advance, so as to increase the particle size (primary particle size), thereby retarding the diffusion of lithium in the active material and decreasing the capacity density of the active material. When the heating temperature is too low, on the other hand, effects of firing cannot be obtained. These tendencies can be suppressed when the heating temperature falls within the range mentioned above. The heating time is not restricted in particular but preferably 3 to 8 hr.

The firing atmosphere is not restricted in particular but preferably an air atmosphere for easier removal of tartaric acid. The firing step can also be performed in an inert atmosphere such as argon gas or nitrogen gas.

The method of manufacturing an active material in accordance with the third embodiment can yield an active material containing $LiVOPO_4$ as a main component and having an average particle size of 10 to 145 nm and a crystallite size of 1 to 70 nm. An electrode using such an active material and a lithium-ion secondary battery using the electrode can attain high discharge capacity even at 1 C. Such knowledge has not conventionally been obtained. Such effects are remarkable as compared with the prior art.

The positive electrode active material layer of the lithium-ion secondary battery in accordance with the third embodiment contains the active material in accordance with the third embodiment. Since the active material in accordance with the third embodiment is used as the positive electrode active material, an electrode having sufficient discharge capacity can be obtained in the third embodiment. The lithium-ion secondary battery in accordance with the third embodiment is the same as that in accordance with the first embodiment except for the active material contained in the positive electrode active material layer.

Though one embodiment of the active material of the third aspect of the present invention, an electrode using the same, a lithium-ion secondary battery equipped with the electrode, and one embodiment of their manufacturing methods have been explained in detail in the foregoing, the third aspect of the present invention is not limited to the third embodiment.

The active material of the third embodiment can also be used as an electrode material for electrochemical devices other than the lithium-ion secondary battery. Examples of such electrochemical devices include secondary batteries other than the lithium-ion secondary battery, e.g., metallic lithium secondary batteries (using an electrode containing $LiVOPO_4$ obtained by the third aspect of the present invention as a positive electrode and metallic lithium as a negative electrode), and electrochemical capacitors such as lithium capacitors. These electrochemical devices can be used for power supplies for self-propelled micromachines, IC cards, and the like and decentralized power supplies placed on or within printed boards.

Examples

The third aspect of the present invention will now be explained more specifically with reference to examples and comparative examples, but will not be limited to the following Examples 21 to 31.

Example 21

Material Preparing Step

First, 18.37 g (0.10 mol) of $V_2O_5$ (having a purity of 99 wt %, manufactured by Nacalai Tesque, Inc.), 23.08 g (0.20 mol) of $H_3PO_4$ (having a purity of 85 wt %, manufactured by Nacalai Tesque, Inc.), and 200 g of distilled water (for HPLC, manufactured by Nacalai Tesque, Inc.) were introduced into a 500-mL Erlenmeyer flask and stirred with a magnetic stirrer. While the stirring was continued, 30.19 g (0.20 mol) of L-(+)-tartaric acid were added into the mixture. When the stirring was continued for about 23 hr after adding L-(+)-tartaric acid, a blue transparent solution was obtained. After introducing 8.48 g (0.20 mol) of $LiOH.H_2O$ (having a purity of 99 wt %, manufactured by Nacalai Tesque, Inc.) into a 0.5-L cylindrical container made of glass for an autoclave, 271.53 g (96.6% of the fed amount) of the above-mentioned solution were added, and they were stirred, whereby the blue transparent solution was maintained.

Hydrothermal Synthesis Step

The container was closed, heated to 250° C. over 5 hr, and held at 250° C. for 10 hr, so as to perform the hydrothermal synthesis. The container was left to cool to room temperature, whereby a green suspension was obtained. The pH of this material was 3 to 4 upon measurement. After removing its supernatant, the precipitate within the container was washed while stirring with about 300 ml of distilled water added thereto. Thereafter, suction filtration (washing with water) was performed. After repeating this operation twice, the precipitate was washed with about 800 ml of acetone added thereto as in the washing with water mentioned above. The resulting material was transferred to a Petri dish and dried in the air, whereby 34.60 g of a brown solid were obtained. The yield was 102.4% when converted to $LiVOPO_4$.

Identification of the Active Material by X-Ray Diffractometry and Measurement of the Crystallite Size Thus obtained active material was subjected to the X-ray diffractometry. Among a plurality of peaks, relatively high intensity peaks were obtained at $2\theta=27.21°$, 27.314°, and 29.7°, whereby the active material was seen to mainly contain $LiVOPO_4$ having the $\alpha$-type crystal structure. The crystallite size was calculated by measuring the half width by an X-ray diffractometer and inputting it into the following Scherrer equation:

$$\text{Crystallite size}(')=K\cdot\lambda/(\beta\cdot\cos\theta) \quad (1)$$

Here, the Scherrer factor was 0.9. Table 3 shows the result of crystallite size. The X-ray diffraction chart was broad in the vicinity of $2\theta=25°$ to 29°, which seemed to result from the fact that the crystallite size was very small.

Measurement of the Average Primary Particle Size

A particle size distribution of thus obtained primary particles 201 was calculated from the cumulative ratio of the projected area circle-equivalent diameter determined from (100) projected areas of the active material based on an image observed through a high-resolution scanning electron microscope. According to thus obtained number-based particle size distribution of the primary particles 201, the average primary particle size of the active material was calculated. Table 3 shows the result.

Observation of the Form of the Active Material

The form of the active material was observed through a transmission electron microscope (product name: JEM-2100F manufactured by JEOL Ltd.). The obtained active material 200 was equipped with a structure in which very small primary particles were aggregated as illustrated in FIG. 3, while the aggregates (secondary particles) were spherical in shape.

Measurement of the Discharge Capacity

The active material of Example 21 and a mixture of polyvinylidene fluoride (PVDF) as a binder and acetylene black as a conductive material were dispersed into N-methyl-2-pyrrolidone (NMP) acting as a solvent, so as to prepare a slurry. The slurry was prepared such that the active material, acetylene black, and PVDF had a weight ratio of 84:8:8. The slurry was applied onto an aluminum foil acting as a current collector, dried, and then extended under pressure, so as to yield an electrode (positive electrode) formed with an active material layer containing the active material of Example 21.

Next, thus obtained electrode and an Li foil acting as its opposite electrode were laminated with a separator made of a microporous polyethylene film interposed therebetween, so as to yield a multilayer body (matrix). This multilayer body was put into an aluminum-laminated pack, a 1-M $LiPF_6$ solution was injected therein as an electrolytic solution, and then the pack was sealed in vacuum, so as to make an evaluation cell of Example 21.

Using the evaluation cell of Example 21, the discharge capacity (unit: mAh/g) at a discharge rate of 1 C (the current value by which constant-current discharging at 25° C. completed in 1 hr) was measured. Table 3 shows the result.

Example 22

An active material was made as in Example 21 except that the hydrothermal synthesis step performed the hydrothermal synthesis at a temperature of 280° C. for 15 hr. This active material was subjected to the observation through the electron microscope and X-ray diffractometry as in Example 21, so as to measure the crystallite size and average primary particle size of the active material. Using thus obtained active material, an electrode and an evaluation cell were made as in Example 21. The discharge capacity (unit: mAh/g) of the evaluation cell of Example 22 was measured as in Example 21. Table 3 lists the results.

Example 23

An active material was made as in Example 21 except that 0.05 mol of tartaric acid was added in the material preparation step such that the ratio of the number of moles of tartaric acid to the number of moles of vanadium atoms contained in the pentavalent vanadium source became 25 mol %. This active material was subjected to the observation through the electron microscope and X-ray diffractometry as in Example 21, so as to measure the crystallite size and average primary particle size of the active material. Using thus obtained active material, an electrode and an evaluation cell were made as in Example 21. The discharge capacity (unit: mAh/g) of the evaluation cell of Example 23 was measured as in Example 21. Table 3 lists the results.

Example 24

An active material was made as in Example 21 except that 0.25 mol of tartaric acid was added in the material preparation step such that the ratio of the number of moles of tartaric acid to the number of moles of vanadium atoms contained in the pentavalent vanadium source became 125 mol %. This active material was subjected to the observation through the electron microscope and X-ray diffractometry as in Example 21, so as to measure the crystallite size and average primary particle size of the active material. Using thus obtained active material, an electrode and an evaluation cell were made as in Example 21. The discharge capacity (unit: mAh/g) of the evaluation cell of Example 24 was measured as in Example 21. Table 3 lists the results.

Example 25

An active material was made as in Example 21 except that the hydrothermal synthesis step performed the hydrothermal synthesis at a temperature of 220° C. This active material was subjected to the observation through the electron microscope and X-ray diffractometry as in Example 21, so as to measure the crystallite size and average primary particle size of the active material. Using thus obtained active material, an electrode and an evaluation cell were made as in Example 21. The discharge capacity (unit: mAh/g) of the evaluation cell of Example 25 was measured as in Example 21. Table 3 lists the results.

Example 26

An active material was made as in Example 25 except that 0.1 mol of tartaric acid was added in the material preparation step such that the ratio of the number of moles of tartaric acid to the number of moles of vanadium atoms contained in the pentavalent vanadium source became 50 mol %. This active material was subjected to the observation through the electron microscope and X-ray diffractometry as in Example 21, so as to measure the crystallite size and average primary particle size of the active material. Using thus obtained active material, an electrode and an evaluation cell were made as in Example 21. The discharge capacity (unit: mAh/g) of the evaluation cell of Example 26 was measured as in Example 21. Table 3 lists the results.

Example 27

An active material was made as in Example 25 except that 0.14 mol of tartaric acid was added in the material preparation step such that the ratio of the number of moles of tartaric acid to the number of moles of vanadium atoms contained in the pentavalent vanadium source became 70 mol %. This active material was subjected to the observation through the electron microscope and X-ray diffractometry as in Example 21, so as to measure the crystallite size and average primary particle size of the active material. Using thus obtained active material, an electrode and an evaluation cell were made as in Example 21. The discharge capacity (unit: mAh/g) of the evaluation cell of Example 27 was measured as in Example 21. Table 3 lists the results.

Example 28

An active material was made as in Example 21 except that 0.02 mol of tartaric acid was added in the material preparation step such that the ratio of the number of moles of tartaric acid to the number of moles of vanadium atoms contained in the pentavalent vanadium source became 10 mol %. This active material was subjected to the observation through the electron microscope and X-ray diffractometry as in Example 21, so as to measure the crystallite size and average primary particle size of the active material. Using thus obtained active material, an electrode and an evaluation cell were made as in Example 21. The discharge capacity (unit: mAh/g) of the evaluation cell of Example 28 was measured as in Example 21. Table 3 lists the results.

Example 29

An active material was made as in Example 21 except that 0.3 mol of tartaric acid was added in the material preparation step such that the ratio of the number of moles of tartaric acid to the number of moles of vanadium atoms contained in the pentavalent vanadium source became 150 mol %. This active material was subjected to the observation through the electron microscope and X-ray diffractometry as in Example 21, so as to measure the crystallite size and average primary particle size of the active material. Using thus obtained active material, an electrode and an evaluation cell were made as in Example 21. The discharge capacity (unit: mAh/g) of the evaluation cell of Example 29 was measured as in Example 21. Table 3 lists the results.

Example 30

An active material was made as in Example 21 except that 0.285 L of distilled water was added in the material preparation step such that the tartaric acid concentration in the solution became 0.7 mol/L while the ratio of the number of moles of tartaric acid to the number of moles of vanadium atoms contained in the pentavalent vanadium source was 100 mol %. This active material was subjected to the observation through the electron microscope and X-ray diffractometry as in Example 21, so as to measure the crystallite size and average primary particle size of the active material. Using thus obtained active material, an electrode and an evaluation cell were made as in Example 21. The discharge capacity (unit: mAh/g) of the evaluation cell of Example 30 was measured as in Example 21. Table 3 lists the results.

Example 31

An active material was made as in Example 21 except that 0.133 L of distilled water was added in the material preparation step such that the tartaric acid concentration in the solution became 1.5 mol/L while the ratio of the number of moles of tartaric acid to the number of moles of vanadium atoms contained in the pentavalent vanadium source was 100 mol %. This active material was subjected to the observation through the electron microscope and X-ray diffractometry as in Example 21, so as to measure the crystallite size and average primary particle size of the active material. Using thus obtained active material, an electrode and an evaluation cell were made as in Example 21. The discharge capacity (unit: mAh/g) of the evaluation cell of Example 31 was measured as in Example 21. Table 3 lists the results.

Comparative Example 21

An active material was made as in Example 21 except that hydrazine was used as the reductant in the hydrothermal synthesis step. This active material was subjected to the observation through the electron microscope and X-ray diffractometry as in Example 21, so as to measure the crystallite size and average primary particle size of the active material. Using thus obtained active material, an electrode and an evaluation cell were made as in Example 21. The discharge capacity (unit: mAh/g) of the evaluation cell of Comparative Example 21 was measured as in Example 21. Table 3 lists the results.

Comparative Example 22

An active material was made as in Example 21 except that no reductant was used in the hydrothermal synthesis step. This active material was subjected to the observation through the electron microscope and X-ray diffractometry as in Example 21, so as to measure the crystallite size and average primary particle size of the active material. Using thus obtained active material, an electrode and an evaluation cell were made as in Example 21. The discharge capacity (unit: mAh/g) of the evaluation cell of Comparative Example 22 was measured as in Example 21. Table 3 lists the results.

Comparative Example 23

An active material was made as in Example 21 except that the amounts of addition of $V_2O_5$, $H_3PO_4$, $LiOH.H_2O$, and L-(+)-tartaric acid were changed to 1/1000 such that the tartaric acid concentration in the solution became 0.001 mol/L while the ratio of the number of moles of tartaric acid to the number of moles of vanadium atoms contained in the pentavalent vanadium source was 100 mol %. This active material was subjected to the observation through the electron microscope and X-ray diffractometry as in Example 21, so as to measure the crystallite size and average primary particle size of the active material. Using thus obtained active material, an electrode and an evaluation cell were made as in Example 21. The discharge capacity (unit: mAh/g) of the evaluation cell of Comparative Example 23 was measured as in Example 21. Table 3 lists the results.

Comparative Example 24

An active material was made as in Example 21 except that 0.065 L of distilled water was added in the material preparation step such that the tartaric acid concentration in the solution became 3 mol/L ratio while the ratio of the number of moles of tartaric acid to the number of moles of vanadium atoms contained in the pentavalent vanadium source was 100 mol %. This active material was subjected to the observation through the electron microscope and X-ray diffractometry as in Example 21, so as to measure the crystallite size and average primary particle size of the active material. Using thus obtained active material, an electrode and an evaluation cell were made as in Example 21. The discharge capacity (unit: mAh/g) of the evaluation cell of Comparative Example 24 was measured as in Example 21. Table 3 lists the results.

Active Material

Figure 4:
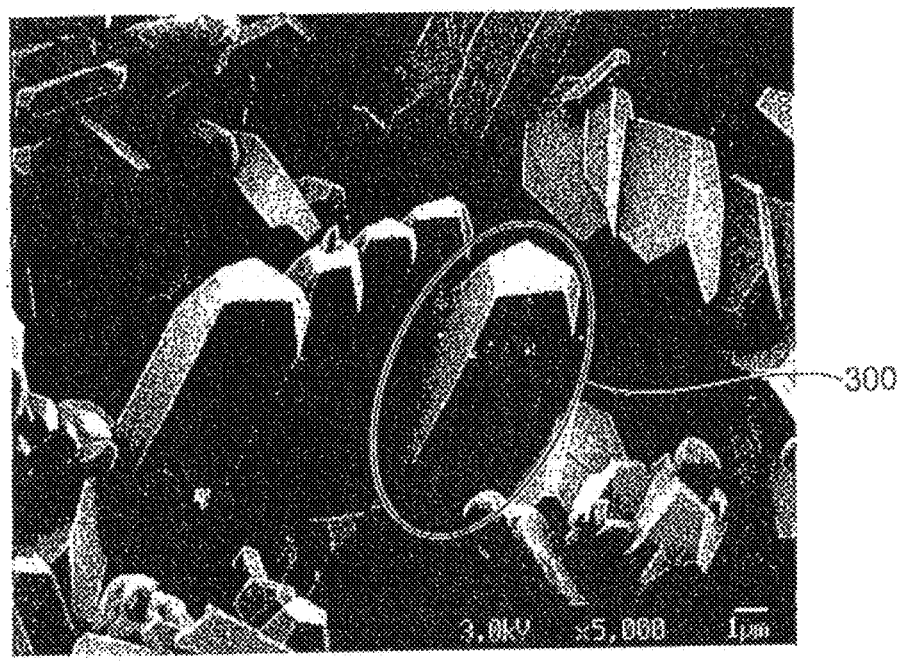
FIG. 4 is an electron micrograph showing an example of an active material group assembled by a plurality of active materials in accordance with an embodiment of the fourth aspect of the present invention.
Figure 5:
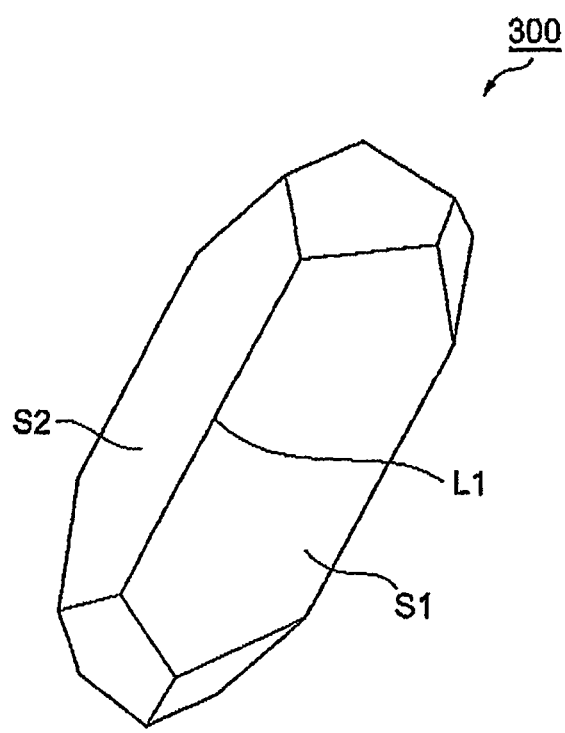
FIG. 5 is a perspective view schematically illustrating the active material in accordance with an embodiment of the fourth aspect of the present invention.
Figure 6:
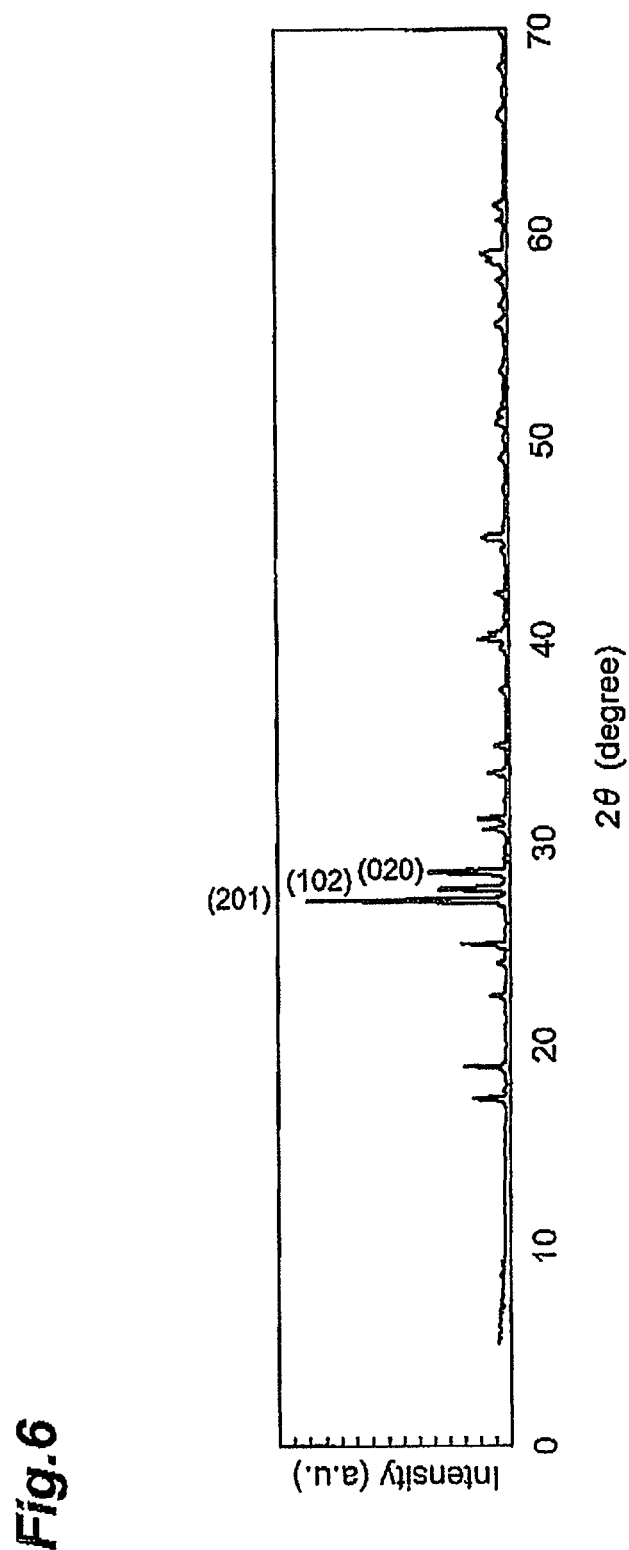
FIG. 6 is an X-ray diffraction chart of an active material group in accordance with an embodiment of the fourth aspect of the present invention.

First, an active material in accordance with the fourth embodiment will be explained. FIG. 4 is an electron micrograph showing an example of an active material group formed by aggregation of a plurality of active materials in accordance with the fourth embodiment. FIG. 5 is a perspective view schematically illustrating one active material 300 constituting the active material group depicted in FIG. 4. The particle form of the active material in accordance with the fourth embodiment is a prism-shaped polyhedron mainly surrounded by hexagonal and pentagonal surfaces. FIG. 6 is an X-ray diffraction chart of the active material group in accor-

TABLE 3

| Table 3 | Reductant | Reductant concentration (mol/l) | Reductant concentration (mol % vs. V) | Secondary particle form | Hydrothermal synthesis condition Temperature (°C.) | Hydrothermal synthesis condition Time (h) | Crystallite size (nm) | Average primary particle size (nm) | Discharge capacity (mAhg$^{-1}$) 1C, 60° C. |
|---|---|---|---|---|---|---|---|---|---|
| Example 21 | tartaric acid | 1 | 100 | spherical | 250 | 10 | 18 | 43 | 75 |
| Example 22 | tartaric acid | 1 | 100 | spherical | 280 | 15 | 30 | 71 | 70 |
| Example 23 | tartaric acid | 1 | 25 | spherical | 250 | 10 | 39 | 93 | 65 |
| Example 24 | tartaric acid | 1 | 125 | spherical | 250 | 10 | 44 | 105 | 64 |
| Example 25 | tartaric acid | 1 | 100 | spherical | 220 | 10 | 23 | 56 | 72 |
| Example 26 | tartaric acid | 1 | 50 | spherical | 220 | 10 | 33 | 78 | 67 |
| Example 27 | tartaric acid | 1 | 70 | spherical | 220 | 10 | 26 | 63 | 69 |
| Example 28 | tartaric acid | 1 | 10 | irregular | 250 | 10 | 58 | 138 | 52 |
| Example 29 | tartaric acid | 1 | 150 | irregular | 250 | 10 | 6 | 15 | 48 |
| Example 30 | tartaric acid | 0.7 | 100 | spherical | 250 | 10 | 67 | 143 | 49 |
| Example 31 | tartaric acid | 1.5 | 100 | spherical | 250 | 10 | 64 | 140 | 50 |
| Comparative Example 21 | hydrazine | 1 | 100 | irregular | 250 | 10 | 753 | 1800 | 33 |
| Comparative Example 22 | — | 1 | 0 | particulate | 250 | 10 | 89 | 213 | 41 |
| Comparative Example 23 | tartaric acid | 0.001 | 100 | irregular | 250 | 10 | 651 | 1455 | 38 |
| Comparative Example 24 | tartaric acid | 3 | 100 | irregular | 250 | 10 | 107 | 251 | 43 |

Examples 21 to 31 prepared such that the tartaric acid concentration in the solution fell within the range of 0.5 to 2.0 mol/L while the ratio of the number of moles of tartaric acid to the number of moles of vanadium atoms contained in the pentavalent vanadium source was within the range of 10 to 150 mol % attained very small crystallite sizes and average primary particle sizes, thereby yielding sufficient discharge capacity at 1 C. Examples 21 to 27 prepared such that the tartaric acid concentration in the solution was 1.0 mol/L while the ratio of the number of moles of tartaric acid to the number of moles of vanadium atoms contained in the pentavalent vanadium source was within the range of 25 to 125 mol %, Examples 21, 22, and 25 to 27 prepared such that the ratio of the number of moles of tartaric acid to the number of moles of vanadium atoms contained in the pentavalent vanadium source was within the range of 50 to 100 mol % in particular, controlled the crystallite size and average primary particle size within an appropriate range, thereby yielding sufficient discharge capacity at 1 C.

REFERENCE SIGNS LIST

201 . . . active material; 200 . . . active material group

Embodiment of Fourth Aspect of Invention

In the following, an embodiment of the fourth aspect of the present invention (hereinafter referred to as "fourth embodiment") will be explained in detail with reference to the drawings. In the drawings, the same or equivalent parts will be referred to with the same signs while omitting their overlapping descriptions. Ratios of dimensions in the drawings are not limited to those depicted.

dance with the fourth embodiment. The active material 300 is an active material containing LiVOPO$_4$ of the β-crystal structure as a main component, in which, according to X-ray diffractometry, the ratio of a peak intensity attributable to a (102) plane to a peak intensity attributable to a (020) plane is at least 0.6 but not more than 1.9, and the ratio of a peak intensity attributable to a (201) plane to the peak intensity attributable to the (020) plane is at least 1.8 but not more than 4.0.

Here, by "containing LiVOPO$_4$ of the β-crystal structure as a main component" is meant containing at least 80 mass % of LiVOPO$_4$ having the β-crystal structure with respect to the total amount of LiVOPO$_4$ having the α-crystal structure and LiVOPO$_4$ having the β-crystal structure. The amounts of LiVOPO$_4$ having the β-crystal structure, LiVOPO$_4$ having the α-crystal structure, and the like in the active material can be measured by X-ray diffractometry, for example. Typically, LiVOPO$_4$ having the β-type crystal structure exhibits a peak at 2θ=27.0 degrees, while LiVOPO$_4$ having the α-type crystal structure exhibits a peak at 2θ=27.2 degrees. The active material may contain trace amounts of unreacted material components and the like in addition to LiVOPO$_4$ having the β-type crystal structure and LiVOPO$_4$ having the α-type crystal structure.

Preferably, from the viewpoint of attaining higher discharge capacity, the ratio of the peak intensity attributable to the (102) plane to the peak intensity attributable to the (020) plane is at least 0.6 but not more than 1.0 while the ratio of the peak intensity attributable to the (201) plane to the peak intensity attributable to the (020) plane is at least 1.8 but not more than 3.0.

Since the active material 300 is a polyhedron containing LiVOPO$_4$ of the β-type crystal structure as a main component, while its orientations to the (102) and (201) planes are lower and higher than those in the conventional active materials, respectively, so that their ratios fall within the specific ranges mentioned above, sufficient discharge capacity can be obtained even upon discharging at 0.1 C.

The particle form of the active material 300 is a columnar polyhedron as illustrated in FIG. 5. In the active material 300, surfaces S1, S2 extending along the axis of the polyhedron seem to be constituted by {110} planes. Here, the {110} planes are planes including those represented by (110), (1-10), (−110), and (−1-10). In the fourth embodiment, the axial diameter of the active material 300, which is a columnar polyhedron, is expressed by the maximum moving distance in the axial direction, i.e., the length between parallel external tangents (so-called Feret diameter) of a projected image, while the diameter is preferably 1 to 10 μm. The diameter can be measured from a SEM image, for example. A diameter orthogonal to the former diameter is preferably 0.3 to 5 μm.

Method of Manufacturing an Active Material

The method of manufacturing an active material in accordance with the fourth embodiment will now be explained. The method of manufacturing an active material in accordance with the fourth embodiment comprises the following hydrothermal synthesis step.

Hydrothermal Synthesis Step

The hydrothermal synthesis step is a step which heats a mixture containing a lithium source, a pentavalent vanadium source, a phosphate source, water, and citric acid to 200° C. or higher under pressure.

Mixture

Examples of the lithium source include lithium compounds such as LiNO$_3$, Li$_2$CO$_3$, LiOH, LiCl, Li$_2$SO$_4$, and CH$_3$COOLi. Preferred among them are LiNO$_3$ and Li$_2$CO$_3$. Examples of the pentavalent vanadium source include vanadium compounds such as V$_2$O$_5$ and NH$_4$VO$_3$. Examples of the phosphate source include PO$_4$-containing compounds such as H$_3$PO$_4$, NH$_4$H$_2$PO$_4$, (NH$_4$)$_2$HPO$_4$, and Li$_3$PO$_4$. Preferred among them are H$_3$PO$_4$ and (NH$_4$)$_2$HPO$_4$.

Preferably, the lithium source is compounded such that the ratio of the number of moles of lithium atoms to the number of moles of pentavalent vanadium atoms becomes 0.95 to 1.2. Preferably, the phosphate source is compounded such that the ratio of the number of moles of phosphorus atoms to the number of moles of pentavalent vanadium atoms becomes 0.95 to 1.2. When the compounding ratio of at least one of the lithium and phosphorus atoms is less than 0.95, the discharge capacity and rate characteristic of the resulting active material tend to become lower. When the compounding ratio of at least one of the lithium and phosphorus atoms is more than 1.2, the discharge capacity of the resulting active material tends to decrease.

Preferably, the ratio of the number of moles of citric acid to the number of moles of pentavalent vanadium atoms is 10 to 100 mol %. When citric acid is compounded by the above-mentioned ratio to the number of moles of vanadium atoms, the active material in accordance with the fourth embodiment can be obtained more reliably. Preferably, the amount of citric acid is 0.1 to 1.0 mol/L with respect to the total amount of the mixture. Meanwhile, when making an active material containing layer of an electrode by using thus obtained active material, a conductive material such as a carbon material is typically brought into contact with a surface of the active material in order to enhance conductivity. As a method therefor, while the active material containing layer may be formed by mixing the active material and the conductive material after making the active material, carbon can be attached to the active material by adding a carbon material as a conductive material into a mixture to become a material for a hydrothermal synthesis, for example.

When adding a conductive material which is a carbon material into the mixture, examples of the conductive material include activated carbon, graphite, soft carbon, and hard carbon. Among them, activated carbon, which can easily disperse carbon particles into the mixture at the time of hydrothermal synthesis, is preferably used. Here, it is not necessary for the whole amount of the conductive material to be mixed with the mixture at the time of hydrothermal synthesis. Preferably, at least a part of the conductive material is mixed with the mixture at the time of hydrothermal synthesis. This may lower the amount of the binder at the time of forming the active material containing layer and increase the capacity density.

Preferably, the content of the above-mentioned conductive material such as a carbon particle in the mixture in the hydrothermal synthesis step is adjusted such that the number of moles C of carbon atoms constituting the carbon particle and the number of moles M of vanadium atoms contained in the pentavalent vanadium source, for example, satisfy the relationship of $0.04 \leq C/M \leq 4$. When the content of the conductive material (number of moles C) is too small, the electronic conductivity and capacity density of the electrode active material constituted by the active material and conductive material tend to decrease. When the conductive material content is too large, the weight occupied by the active material in the electrode active material tends to decrease relatively, thereby lowering the capacity density of the electrode active material. These tendencies can be suppressed when the conductive material content falls within the range mentioned above.

While the amount of water in the mixture is not restricted in particular as long as the hydrothermal synthesis is possible, the ratio of materials other than water in the mixture is preferably 35 mass % or less.

The order of feeding the materials when preparing the mixture is not restricted in particular. For example, all the materials may be mixed together. Alternatively, the pentavalent vanadium compound, citric acid, and the lithium compound may sequentially be added in this order to the mixture of water and the PO$_4$-containing compound. Preferably, the mixture is fully mixed, so as to disperse added components sufficiently. Preferably, in particular, at least a part of the lithium compound, pentavalent vanadium compound, and PO$_4$-containing compound is undissolved in water, whereby the mixture is a suspension.

First, in the hydrothermal synthesis step, the above-mentioned mixture (of the lithium compound, pentavalent vanadium compound, PO$_4$-containing compound, water, citric acid, and the like) is fed into a reaction vessel having a function of heating and pressurizing the inside thereof (e.g., autoclave). The mixture may be prepared in the reaction vessel as well.

Next, the reaction vessel is closed, and the mixture is heated to 200° C. or higher under pressure, so that a hydrothermal reaction of the mixture proceeds. This hydrothermally synthesizes a material in accordance with the fourth embodiment containing LiVOPO$_4$ of β-type crystal structure as a main component and exhibiting a polyhedral particle form.

The material containing LiVOPO$_4$ of the β-type crystal structure as a main component and exhibiting a polyhedral particle form obtained by the hydrothermal synthesis typically precipitates as a solid in the liquid after the hydrothermal synthesis. For example, the liquid after the hydrothermal synthesis is filtrated, so as to collect a solid, which is washed with water, acetone, or the like and then dried, whereby LiVOPO$_4$ having the β-type crystal structure can be obtained with high purity.

Preferably, the pressure applied to the mixture in the hydrothermal synthesis step is 0.1 to 30 MPa. When the pressure applied to the mixture is too low, the resulting LiVOPO$_4$ tends to lower its crystallinity, thereby decreasing the capacity density of the active material. When the pressure applied to the mixture is too high, the reaction vessel tends to require high pressure resistance, thereby increasing the cost for manufacturing the active material. These tendencies can be suppressed when the pressure applied to the material mixture falls within the range mentioned above.

The temperature of the mixture in the hydrothermal synthesis step is preferably 200 to 300° C., more preferably 220 to 280° C. from the viewpoint of improving the discharge capacity of the resulting active material. When the temperature of the mixture is too low, the resulting LiVOPO$_4$ tends to lower its crystallinity, thereby decreasing the capacity density of the active material. When the temperature of the mixture is too high, the reaction vessel tends to require high heat resistance, thereby increasing the cost for manufacturing the active material. These tendencies can be suppressed when the temperature of the mixture falls within the range mentioned above.

Firing Step

The method of manufacturing an active material in accordance with the fourth embodiment may further comprise a step (which may also be referred to as "firing step" in the following) of heating the material obtained by the hydrothermal synthesis, i.e., the material containing LiVOPO$_4$ of the β-type crystal structure as a main component and exhibiting a polyhedral particle form. This step seems to cause a phenomenon of removing impurities and the like remaining in the active material obtained through the hydrothermal synthesis step.

The firing step may heat the above-mentioned LiVOPO$_4$ having the β-type crystal structure to a temperature of 400 to 600° C. When the heating temperature is too high, the particle growth of the active material tends to advance, so as to increase the particle size (primary particle size), thereby retarding the diffusion of lithium in the active material and decreasing the capacity density of the active material. When the heating temperature is too low, on the other hand, effects of firing cannot be obtained. These tendencies can be suppressed when the heating temperature falls within the range mentioned above. The heating time is not restricted in particular but preferably 3 to 8 hr.

The atmosphere in the firing step is not restricted in particular but preferably an air atmosphere for easier removal of citric acid. The firing step can also be performed in an inert atmosphere such as argon gas or nitrogen gas.

The method of manufacturing an active material in accordance with the fourth embodiment can yield an active material containing LiVOPO$_4$ as a main component and a polyhedral particle form, in which the ratio of the peak intensity attributable to the (102) plane to the peak intensity attributable to the (020) plane is at least 0.6 but not more than 1.9 while the ratio of the peak intensity attributable to the (201) plane to the peak intensity attributable to the (020) plane is at least 1.8 but not more than 4.0. An electrode using such an active material and a lithium-ion secondary battery using the electrode can attain high discharge capacity. Such knowledge has not conventionally been obtained. Such effects are remarkable as compared with the prior art.

The positive electrode active material layer of the lithium-ion secondary battery in accordance with the fourth embodiment contains the active material in accordance with the fourth embodiment. The lithium-ion secondary battery in accordance with the fourth embodiment is the same as that in accordance with the first embodiment except for the active material contained in the positive electrode active material layer.

The active material of the fourth embodiment can also be used as an electrode material for electrochemical devices other than the lithium-ion secondary battery. Examples of such electrochemical devices include secondary batteries other than the lithium-ion secondary battery, e.g., metallic lithium secondary batteries (using an electrode containing the active material obtained by the fourth aspect of the present invention as a positive electrode and metallic lithium as a negative electrode), and electrochemical capacitors such as lithium capacitors. These electrochemical devices can be used for power supplies for self-propelled micromachines, IC cards, and the like and decentralized power supplies placed on or within printed boards.

Examples

The fourth aspect of the present invention will now be explained more specifically with reference to examples and comparative examples, but will not be limited to the following Examples 41 to 47.

Example 41

Hydrothermal Synthesis Step

First, 23.06 g (0.20 mol) of H$_3$PO$_4$ (having a purity of 85 wt %, manufactured by Nacalai Tesque, Inc.) and 180 g of distilled water (for HPLC, manufactured by Nacalai Tesque, Inc.) were introduced into a 500-mL Erlenmeyer flask and stirred with a magnetic stirrer. Subsequently, 18.37 g (0.10 mol) of V$_2$O$_5$ (having a purity of 99 wt %, manufactured by Nacalai Tesque, Inc.) were added, and the resulting mixture was stirred for about 2.5 hr, whereby a yellowish orange suspension was obtained. After increasing the rotating speed of stirring, 10.56 g (0.05 mol) of citric acid monohydrate were added to the mixture while keeping on stirring, whereby a pasty material having fluidity was obtained. After adding 8.48 g (0.20 mol) of LiOH.H$_2$O (having a purity of 99 wt %, manufactured by Nacalai Tesque, Inc.) and 20 g of distilled water sequentially in this order to the pasty material, 258.70 g of the material within the flask were transferred into a 0.5-L cylindrical container made of glass for an autoclave. The material mixture before the hydrothermal synthesis was a suspension. The container was closed and held at 250° C. for 12 hr, so as to perform the hydrothermal synthesis.

After turning off the heater switch, the container was left to cool until the temperature therewithin became 23° C., whereby a brownish solution containing a brown precipitate was obtained. The pH of this material was 3 upon measurement. After removing its supernatant, the precipitate within the container was washed while stirring with about 300 ml of distilled water added thereto. Thereafter, suction filtration (washing with water) was performed. After repeating this operation twice, the precipitate was washed with about 800 ml of acetone added thereto as in the washing with water mentioned above. The material after the filtration was passed through a sieve (with a mesh-forming pore diameter of 52 µm). The resulting material was transferred to a Petri dish and dried in the air, whereby 30.83 g of a brown solid were obtained. The yield was 91.9% when converted to LiVOPO$_4$.

Firing Step

Of the material after washing with acetone, 3.00 g were put into an alumina crucible, heated from room temperature to 450° C. over 45 min in an air atmosphere, and heat-treated at 450° C. for 4 hr, whereby 2.97 g of a powder were obtained.

Identification of the Crystal Structure

The active material of Example 41 was subjected to the X-ray diffractometry. Among a plurality of peaks, relatively high intensity peaks were obtained at 2θ=26.966°, 27.582°, and 28.309°, whereby the active material was seen to be mainly constituted by LiVOPO$_4$ having the β-type crystal structure.

Calculation of Peak Intensity Ratios ($I_{(102)/(020)}$ and $I_{(201)/(020)}$) of the Active Material by X-Ray Diffractometry The peaks at 26.966°, 27.582°, and 28.309° were attributed to (201), (102), and (020), respectively. Table 4 lists the peak intensity ratio ($I_{(102)/(020)}$) of the peak at 2θ=27.582° to the peak at 2θ=28.309° and the peak intensity ratio ($I_{(201)/(020)}$) of the peak at 2θ=26.966° to the peak at 2θ=28.309°

Observation of the Form of the Active Material

The form of the active material of Example 41 was observed through a transmission electron microscope. FIG. 4 shows an electron micrograph of the active material of Example 41. The particle form of the active material was a columnar polyhedron. The crystal plane of a plane extending along the axis of the polyhedron was measured by electron diffractometry. The crystal plane was attributed to the {110} plane.

Measurement of the Discharge Capacity

The active material of Example 41 and a mixture of polyvinylidene fluoride (PVDF) as a binder and acetylene black as a conductive material were dispersed into N-methyl-2-pyrrolidone (NMP) acting as a solvent, so as to prepare a slurry. The slurry was prepared such that the active material, acetylene black, and PVDF had a weight ratio of 84:8:8. The slurry was applied onto an aluminum foil acting as a current collector, dried, and then extended under pressure, so as to yield an electrode (positive electrode) formed with an active material layer containing the active material of Example 41.

Next, thus obtained electrode and an Li foil acting as its opposite electrode were laminated with a separator made of a microporous polyethylene film interposed therebetween, so as to yield a multilayer body (matrix). This multilayer body was put into an aluminum-laminated pack, a 1-M LiPF$_6$ solution was injected therein as an electrolytic solution, and then the pack was sealed in vacuum, so as to make an evaluation cell of Example 41.

Using the evaluation cell of Example 41, the discharge capacity (unit: mAh/g) at a discharge rate of 0.1 C (the current value by which constant-current discharging at 25° C. completed in 10 hr) was measured. Table 4 shows the result.

Example 42

An active material was made as in Example 41 except that no firing step was performed after the hydrothermal synthesis step. The active material was subjected to the X-ray diffractometry as in Example 41, so as to calculate $I_{(102)/(020)}$ and $I_{(201)/(020)}$. Using thus obtained active material, an electrode and an evaluation cell were made as in Example 41. The discharge capacity (unit: mAh/g) of the evaluation cell of Example 42 was measured as in Example 41. Table 4 lists the results.

Example 43

An active material was made as in Example 42 except that the hydrothermal synthesis was performed for 15 hr. The active material was subjected to the X-ray diffractometry as in Example 41, so as to calculate $I_{(102)/(020)}$ and $I_{(201)/(020)}$. Using thus obtained active material, an electrode and an evaluation cell were made as in Example 41. The discharge capacity (unit: mAh/g) of the evaluation cell of Example 43 was measured as in Example 41. Table 4 lists the results.

Example 44

An active material was made as in Example 41 except that the hydrothermal synthesis was performed at 220° C. The active material was subjected to the X-ray diffractometry as in Example 41, so as to calculate $I_{(102)/(020)}$ and $I_{(201)/(020)}$. Using thus obtained active material, an electrode and an evaluation cell were made as in Example 41. The discharge capacity (unit: mAh/g) of the evaluation cell of Example 44 was measured as in Example 41. Table 4 lists the results.

Example 45

An active material was made as in Example 41 except that the hydrothermal synthesis was performed at 280° C. The active material was subjected to the X-ray diffractometry as in Example 41, so as to calculate $I_{(102)/(020)}$ and $I_{(201)/(020)}$. Using thus obtained active material, an electrode and an evaluation cell were made as in Example 41. The discharge capacity (unit: mAh/g) of the evaluation cell of Example 45 was measured as in Example 41. Table 4 lists the results.

Example 46

An active material was made as in Example 41 except that the firing was performed at 430° C. The active material was subjected to the X-ray diffractometry as in Example 41, so as to calculate $I_{(102)/(020)}$ and $I_{(201)/(020)}$. Using thus obtained active material, an electrode and an evaluation cell were made as in Example 41. The discharge capacity (unit: mAh/g) of the evaluation cell of Example 46 was measured as in Example 41. Table 4 lists the results.

Example 47

An active material was made as in Example 41 except that the firing was performed for 7 hr. The active material was subjected to the X-ray diffractometry as in Example 41, so as to calculate $I_{(102)/(020)}$ and $I_{(201)/(020)}$. Using thus obtained active material, an electrode and an evaluation cell were made as in Example 41. The discharge capacity (unit: mAh/g) of the evaluation cell of Example 47 was measured as in Example 41. Table 4 lists the results.

Comparative Example 41

An active material was made as in Example 41 except that hydrazine was used as the reductant for the hydrothermal synthesis in the hydrothermal synthesis step. The active material was subjected to the X-ray diffractometry as in Example 41, so as to calculate $I_{(102)/(020)}$ and $I_{(201)/(020)}$. Using thus obtained active material, an electrode and an evaluation cell were made as in Example 41. The discharge capacity (unit: mAh/g) of the evaluation cell of Comparative Example 41 was measured as in Example 41. Table 4 lists the results.

Comparative Example 42

An active material was made as in Example 41 except that the hydrothermal synthesis was performed at 190° C. The active material was subjected to the X-ray diffractometry as in Example 41, so as to calculate $I_{(102)/(020)}$ and $I_{(201)/(020)}$. Using thus obtained active material, an electrode and an evaluation cell were made as in Example 41. The discharge capacity (unit: mAh/g) of the evaluation cell of Comparative Example 42 was measured as in Example 41. Table 4 lists the results.

TABLE 4

| Table 4 | Reductant | Reductant amount (mol % vs. V) | Form | Hydrothermal synthesis condition | | Firing condition | | XRD measurement results | | Discharge capacity (mAhg⁻¹) |
|---|---|---|---|---|---|---|---|---|---|---|
| | | | | Temperature (°C.) | Time (h) | Temperature (°C.) | Time (h) | $I_{(102)/(020)}$ | $I_{(201)/(020)}$ | 0.1C, 60° C. |
| Example 41 | citric acid | 25 | polyhedron | 250 | 12 | 450 | 4 | 0.68 | 2.00 | 143 |
| Example 42 | citric acid | 25 | polyhedron | 250 | 12 | — | | 0.82 | 2.54 | 145 |
| Example 43 | citric acid | 25 | polyhedron | 250 | 15 | — | | 1.69 | 3.56 | 133 |
| Example 44 | citric acid | 25 | polyhedron | 220 | 12 | 450 | 4 | 1.86 | 3.77 | 131 |
| Example 45 | citric acid | 25 | polyhedron | 280 | 12 | 450 | 4 | 0.80 | 2.46 | 144 |
| Example 46 | citric acid | 25 | polyhedron | 250 | 12 | 430 | 4 | 0.68 | 3.41 | 129 |
| Example 47 | citric acid | 25 | polyhedron | 250 | 12 | 450 | 7 | 1.72 | 2.00 | 126 |
| Comparative Example 41 | hydrazine | 25 | irregular | 250 | 12 | 450 | 4 | 0.52 | 1.51 | 118 |
| Comparative Example 42 | citric acid | 25 | irregular | 190 | 12 | 450 | 4 | 2.10 | 4.30 | 121 |

Comparative Example 41 using hydrazine as the reductant in the hydrothermal synthesis step yielded the active material with an irregular particle form and exhibited low orientation to the (201) plane and a discharge capacity lower than that of any of Examples 41 to 47. Comparative Example 42 in which the hydrothermal synthesis temperature was 190° C. also yielded the active material with an irregular particle form and exhibited a discharge capacity lower than that of any of Examples 41 to 47. The discharge capacity was lower in Examples 43 and 44 in each of which $I_{(102)/(020)}$ and $I_{(201)/(020)}$ exceeded 1.0 and 3.0, respectively, than in Examples 41, 42, and 45. The discharge capacity was lower in Example 46 whose $I_{(201)/(020)}$ exceeded 3.0 than in Examples 41, 42, and 45. The discharge capacity was lower in Example 47 whose $I_{(102)/(020)}$ exceeded 1.0 than in Examples 41, 42, and 45.

REFERENCE SIGNS LIST

S1, S2 . . . surface including the longest ridge; L1 . . . longest ridge; 300 . . . active material

What is claimed is:

1. An active material including a particle, the particle containing LiVOPO$_4$ as a main component and having an average particle size of 10 to 145 nm and a crystallite size of 15 to 45 nm.

2. An active material according to claim 1, wherein the particle forms an aggregate, the aggregate having an average size of 500 to 5000 nm.

3. An electrode comprising a current collector and an active material layer, disposed on the current collector, containing the active material according to claim 1.

4. A lithium-ion secondary battery comprising the electrode according to claim 3.

5. An active material containing LiVOPO$_4$ of a β-type crystal structure as a main component;

wherein, according to X-ray diffractometry, the ratio of a peak intensity attributable to a (102) plane to a peak intensity attributable to a (020) plane is at least 0.6 but not more than 1.9, and the ratio of a peak intensity attributable to a (201) plane to the peak intensity attributable to the (020) plane is at least 1.8 but not more than 4.0; and wherein the active material has a polyhedral particle form.

6. An active material according to claim 5, wherein the ratio of the peak intensity attributable to the (102) plane to the peak intensity attributable to the (020) plane is at least 0.6 but not more than 1.0, and the ratio of the peak intensity attributable to the (201) plane to the peak intensity attributable to the (020) plane is at least 1.8 but not more than 3.0.

7. An electrode comprising a current collector and an active material layer, disposed on the current collector, containing the active material according to claim 5.

8. A lithium-ion secondary battery comprising the electrode according to claim 7.

* * * * *